US008242959B2

(12) United States Patent
Mia et al.

(10) Patent No.: US 8,242,959 B2
(45) Date of Patent: *Aug. 14, 2012

(54) SPARSED U-TDOA WIRELESS LOCATION NETWORKS

(75) Inventors: Rashidus S. Mia, Phoenixville, PA (US); Robert J. Anderson, Phoenixville, PA (US)

(73) Assignee: TruePosition, Inc., Berwyn, PA (US)

( * ) Notice: Subject to any disclaimer, the term of this patent is extended or adjusted under 35 U.S.C. 154(b) by 1129 days.

This patent is subject to a terminal disclaimer.

(21) Appl. No.: 11/736,902

(22) Filed: Apr. 18, 2007

(65) Prior Publication Data

US 2008/0261612 A1  Oct. 23, 2008

(51) Int. Cl.
G01S 3/02 (2006.01)
H04W 40/00 (2009.01)
(52) U.S. Cl. .................. 342/463; 455/446
(58) Field of Classification Search .......... 455/446; 342/463–465
See application file for complete search history.

(56) References Cited

U.S. PATENT DOCUMENTS

| | | | |
|---|---|---|---|
| 4,728,959 A | 3/1988 | Maloney et al. | 342/457 |
| 5,327,144 A | 7/1994 | Stilp et al. | 342/387 |
| 6,047,192 A | 4/2000 | Maloney et al. | 455/456.2 |
| 6,108,555 A | 8/2000 | Maloney et al. | 455/456.2 |
| 6,119,013 A | 9/2000 | Maloney et al. | 455/456.2 |
| 6,184,829 B1 | 2/2001 | Stilp | 342/387 |
| 6,266,013 B1 | 7/2001 | Stilp et al. | 342/387 |
| 6,285,321 B1 | 9/2001 | Stilp et al. | 342/465 |
| 6,351,235 B1 | 2/2002 | Stilp et al. | 342/357.06 |
| 6,388,618 B1 | 5/2002 | Stilp et al. | 342/457 |
| 6,400,320 B1 | 6/2002 | Stilp et al. | 342/457 |
| 6,463,290 B1 * | 10/2002 | Stilp et al. | 455/456.1 |
| 6,483,460 B2 | 11/2002 | Stilp et al. | 342/457 |
| 6,503,428 B1 | 1/2003 | Parker | 264/71 |
| 6,661,379 B2 | 12/2003 | Stilp et al. | 342/457 |
| 6,729,929 B1 | 5/2004 | Sayers et al. | |
| 6,765,531 B2 | 7/2004 | Anderson | 342/378 |
| 6,782,264 B2 | 8/2004 | Anderson | 455/456.1 |
| 6,873,290 B2 | 3/2005 | Anderson et al. | 342/457 |
| 7,023,383 B2 | 4/2006 | Stilp et al. | 342/457 |
| 7,110,774 B1 * | 9/2006 | Davis et al. | 455/456.1 |

(Continued)

FOREIGN PATENT DOCUMENTS

| | | |
|---|---|---|
| WO | WO 2006/088472 | 8/2006 |
| WO | WO 2008/131020 | 10/2008 |
| WO | WO 2008/131036 | 10/2008 |
| WO | WO 2008/131122 | 10/2008 |
| WO | WO 2008/131125 | 10/2008 |

OTHER PUBLICATIONS

3GPP Organizational Partners, "3GPP TS 21.101 Technical Specification; $3^{rd}$ Generation Partnership Project; Technical Specification Group Services and System Aspects; Technical Specifications and Technical Reports for a UTRAN-based 3GPP system (Release 6)," 2007, version 6.6.0, 1-29.

(Continued)

Primary Examiner — Thomas H. Tarcza
Assistant Examiner — Cassie Galt
(74) Attorney, Agent, or Firm — Woodcock Washburn LLP

(57) ABSTRACT

In an overlay, U-TDOA-based, Wireless Location System, LMUs typically co-located with BTSs, are used to collect radio signaling both in the forward and reverse channels. Techniques are used to compensate for sparse LMU deployments where sections of the U-TDOA service area are uplink demodulation or downlink beacon discovery limited.

20 Claims, 9 Drawing Sheets

U.S. PATENT DOCUMENTS

| | | | |
|---|---|---|---|
| 7,167,713 B2 | 1/2007 | Anderson | |
| 7,277,712 B2* | 10/2007 | Burke | 455/456.1 |
| 7,383,049 B2 | 6/2008 | Deloach | |
| 7,427,952 B2 | 9/2008 | Bull et al. | |
| 7,627,333 B2* | 12/2009 | Kennedy et al. | 455/456.2 |
| 2003/0157939 A1* | 8/2003 | Wang et al. | 455/446 |
| 2003/0224744 A1 | 12/2003 | Sternberg | |
| 2004/0116143 A1 | 6/2004 | Love et al. | |
| 2004/0176027 A1 | 9/2004 | O'Neill | |
| 2006/0003767 A1 | 1/2006 | Kim et al. | |
| 2006/0003775 A1 | 1/2006 | Bull et al. | 455/456.1 |
| 2006/0019679 A1 | 1/2006 | Rappaport et al. | 455/456.5 |
| 2006/0025158 A1 | 2/2006 | Leblanc et al. | 455/456.2 |
| 2006/0030333 A1 | 2/2006 | Ward et al. | |
| 2006/0262011 A1 | 11/2006 | Bull et al. | |
| 2007/0066329 A1 | 3/2007 | Laroia et al. | |
| 2008/0045234 A1 | 2/2008 | Reed | |
| 2008/0261611 A1 | 10/2008 | Mia et al. | |
| 2008/0261613 A1 | 10/2008 | Anderson et al. | |
| 2008/0261614 A1 | 10/2008 | Mia et al. | |

OTHER PUBLICATIONS

GSM and 3GPP, "3GPP TS 05.10 Technical Specification; 3$^{rd}$ Generation Partnership Project; Technical Specification Group GSM/EDGE Radio Access Network; Digital cellular telecommunications system (Phase 2+); Radio subsystem synchronization (Release 1999)," 2003, version 8.12.0, 1-24.

PCT International Preliminary Examination Report on Patentability dated Oct. 20, 2009, issued in PCT/US2008/060507.

PCT International Search Report dated Jul. 2, 2008, issued in PCT/US2008/060507.

PCT International Preliminary Examination Report on Patentability dated Oct. 20, 2009, issued in PCT/US2008/060528.

PCT International Search Report dated Jun. 27, 2008, issued in PCT/US2008/060528.

PCT International Preliminary Examination Report on Patentability dated Oct. 20, 2009, issued in PCT/US2008/060661.

PCT International Search Report dated Jul. 2, 2008, issued in PCT/US2008/060661.

PCT International Preliminary Examination Report on Patentability dated Oct. 20, 2009, issued in PCT/US2008/060665.

PCT International Search Report dated Jul. 2, 2008, issued in PCT/US2008/060665.

Patent Cooperation Treaty, "International Search Report / Written Opinion," International Searching Authority, May 20, 2008, 11 pages.

Patent Cooperation Treaty, "International Search Report / Written Opinion," International Searching Authority, Jun. 27, 2008, PCT/US2008/060528.

* cited by examiner

US 8,242,959 B2

SPARSED U-TDOA WIRELESS LOCATION NETWORKS

CROSS REFERENCE

The subject matter described herein relates to the subject matter described in the following co-pending applications: U.S. patent application Ser. No. 11/736,868, filed Apr. 18, 2007, entitled "Sparsed U-TDOA Wireless Location Networks"; U.S. patent application Ser. No. 11/736,920, filed Apr. 18, 2007, entitled "Sparsed U-TDOA Wireless Location Networks"; and U.S. patent application Ser. No. 11/736,950, filed Apr. 18, 2007, entitled "Sparsed U-TDOA Wireless Location Networks".

TECHNICAL FIELD

The present invention relates generally to methods and apparatus for locating wireless devices, also called mobile stations (MS), such as those used in analog or digital cellular systems, personal communications systems (PCS), enhanced specialized mobile radios (ESMRs), and other types of wireless communications systems. More particularly, but not exclusively, the present invention relates to methods for reducing the receiver deployment density of a Wireless Location System (WLS) and thereby reducing the overall cost of such a deployment.

BACKGROUND

A. Wireless Location

Early work relating to Wireless Location Systems is described in U.S. Pat. No. 5,327,144, Jul. 5, 1994, "Cellular Telephone Location System," which discloses a system for locating cellular telephones using time difference of arrival (TDOA) techniques. This and other exemplary patents (discussed below) are assigned to TruePosition, Inc., the assignee of the present invention. The '144 patent describes what may be referred to as an uplink-time-difference-of-arrival (U-TDOA) cellular telephone location system. The described system may be configured to monitor control channel transmissions from one or more cellular telephones and to use central or station-based processing to compute the geographic location(s) of the phone(s). TruePosition and others have continued to develop significant enhancements to the original inventive concepts. An example of a U-TDOA WLS is depicted in FIG. 1. As shown, the system includes four major subsystems: the Signal Collection Systems (SCS's) 10, the TDOA Location Processors (TLP's) 12, the Application Processors (AP's) 14, and the Network Operations Console (NOC) 16. Each SCS is responsible for receiving the RF signals transmitted by the wireless transmitters on both control channels and voice channels. In general, an SCS (now sometimes called an LMU, or Location Measuring Unit) is preferably installed at a wireless carrier's cell site, and therefore operates in parallel to a base station. Each TLP 12 is responsible for managing a network of SCS's 10 and for providing a centralized pool of digital signal processing (DSP) resources that can be used in the location calculations. The SCS's 10 and the TLP's 12 operate together to determine the location of the wireless transmitters. Both the SCS's 10 and TLP's 12 contain a significant amount of DSP resources, and the software in these systems can operate dynamically to determine where to perform a particular processing function based upon tradeoffs in processing time, communications time, queuing time, and cost. In addition, the WLS may include a plurality of SCS regions each of which comprises multiple SCS's 10. For example, "SCS Region 1" includes SCS's 10A and 10B that are located at respective cell sites and share antennas with the base stations at those cell sites. Drop and insert units 11A and 11B are used to interface fractional T1/E1 lines to full T1/E1 lines, which in turn are coupled to a digital access and control system (DACS) 13A. The DACS 13A and another DACS 13B are used for communications between the SCS's 10A, 10B, etc., and multiple TLP's 12A, 12B, etc. As shown, the TLP's are typically collocated and interconnected via an Ethernet network (backbone) and a second, redundant Ethernet network. Also coupled to the Ethernet networks are multiple AP's 14A and 14B, multiple NOC's 16A and 16B, and a terminal server 15. Routers 19A and 19B are used to couple one WLS to one or more other Wireless Location System(s).

FIG. 1A depicts the components representative of a standard wireless communications system (WCS) 100, which may take the form of a cellular telephone network or the like. Although the technology represented in FIG. 1A is expressed with some of the terminology typical of a Global System for Mobile Communications (GSM) infrastructure, the technology is also comparably applicable to and beneficial for implementations of cellular wireless communications in accord with other standards, such as the Third Generation Partnership Project (3GPP) technical specifications describing the Universal Mobile Telecommunications Service (UMTS). In FIG. 1A, the wireless mobile communications unit or mobile station (MS) 101 communicates via a radio frequency (RF) link carrying transmissions to and from a base transceiver station (BTS) 102. As highlighted in the dashed circle in FIG. 1A, the BTS facilities include the uplink-receive (U_Rx) and downlink-transmit (D_Tx) antenna(s) and associated cables for the appropriate signals carrying the wireless communications. A set of (typically three) BTS cell sectors (or sectorized cellular areas of operation) cover a localized communications area or cell (surrounding a serving BTS) served by the antenna(s) deployed at the BTS terminal location. Each cell sector is identified by its unique cell global identifier (CGI, which term is also used herein to refer to the BTS cell facilities). Each BTS may individually or independently generate its time base or time-standard/reference for its transmitted downlink signals based upon an independent oscillator that operates at a nominal time base frequency, within specification tolerances. For GSM service, a compliant standard BTS timebase reference is specified to operate at 13 MHz, within a tolerance of 0.05 ppm or 0.65 Hz. A set of the various BTSs covering a broader operational region are controlled by a base station controller (BSC) 103. The BSC manages the MSs and BTSs operating within its domain, and this management includes the handover of the responsibility for the integrity of the RF link with a particular MS from one BTS to another, as the MS moves from the cellular coverage of the cells of one BTS to those of the other BTS. In a similar manner at a lower level of communications management, the BSC also manages the handover of an MS from one BTS sector to another and the BTS detects the successful execution of the handovers within its domain. At a higher level of management, a mobile switching center (MSC) 104 manages a multiplicity of BSCs. In supporting the WCS operations, any MS operating under the control of its particular serving CGI (SCGI) is used to synchronize itself to the SCGI's transmitted BTS downlink "beacon" signal, and thus the signals from the distinct BTSs are not required to be synchronized to a common time standard, such as the GPS time base.

FIG. 1B shows a WLS that cooperates as an adjunct to a wireless communications system. In this example, the WLS is called a Serving Mobile Location Center (SMLC) 110. An infrastructure-based, or "overlay," WLS can be represented with the overlay configuration of components depicted in FIG. 1B. In FIG. 1B, the RF uplink signals in the communications channel from the MS/UE 101 of interest are received and measured by LMUs 112 that are deployed at locations distributed throughout the operational domain of the communications system. (Note regarding terminology: In 3GPP GSM terminology, the term "SMLC" refers to the entire WLS whereas in other contexts "SMLC" refers to the sub-system component that is called a "WLP". As also used herein, the 3GPP term "LMU" refers to the geographically dispersed SMLC/WLS component that receives transmitted RF signals and measures (e.g., location-related) signal characteristics, whereas such a component may be called the signal collection system "SCS" in other contexts or descriptions of the background art.) Typically, as may be visualized with the "overlay" of FIG. 1B on top of FIG. 1A, LMUs 112 are deployed at BTS 102 facilities, and thus the LMU usually accesses or "taps" its uplink-receive (U_Rx) signals for the location-related measurements via multi-coupling to the same signal feeds that the BTS uses from the antenna(s) deployed for the communications. For time base synchronization of the (location-related) data collections and measurements at the distributed LMU sites, the LMU accesses GPS signals via a GPS-receive (GPS_Rx) antenna with cable, as highlighted in the dashed circle in FIG. 1B. Additionally, the LMU senses the BTS downlink transmissions via a downlink-receive (D_Rx) antenna with cable. As depicted in FIG. 1B, although the LMUs are typically but not necessarily deployed at BTS sites, they are also not necessarily deployed one-for-one with the BTSs. The measurements of the received signal characteristics extracted by multiple LMUs are managed and collected through wireless location processors (WLPs) 203, each of which directs the operations of multiple LMUs. The WLP oversees the selection of the particular LMUs that are tasked with providing the measurements for a particular MS of interest. Upon reception of the appropriately measured signal data, perhaps including through other WLPs managing LMUs not under its direct control, the WLP will typically also evaluate the data and determine the optimal (location) estimate based upon the data. Typically, a WLP may manage the operations of LMUs covering a geographic region for which the corresponding communications services are provided by multiple BSCs. The wireless location gateway (WLG) 114 of the SMLC conducts overall control and tasking of the WLPs. The WLG is typically (but not necessarily) co-located with a MSC 104 (and may interface with it). The WLG interfaces with and exchanges location-related requests, information, or data with the multiple BSCs it serves within the communications system. The WLG validates the location-service requests, and disperses the location-determination results to authorized recipients.

The performance of a U-TDOA WLS (and other location systems) is normally expressed as one or more circular error probabilities. The United States Federal Communications Commission (FCC), as part of the Enhanced 9-1-1 Phase II mandate, requires that network-based systems, such as a U-TDOA system, be deployed to yield a precision that generates a one-hundred meter (100 m or 328.1 feet) accuracy for 67% of emergency services callers and a three-hundred meter (300 m or 984.25 feet) accuracy for 95% of emergency services callers. The requirements for precision vary with the location service deployed, but if the precision (such as predicted by the Cramer-Rao bound for instance) of the U-TDOA location system is such that the location quality of service is exceeded by a deploying fewer LMUs than BTSs, such a deployment would be advantageous because it would reduce the cost of the system.

The inventive techniques and concepts described herein apply to time and frequency division multiplexed (TDMA/FDMA) radio communications systems including the widely used IS-136 (TDMA), GSM, and OFDM wireless systems, as well as code-division radio communications systems such as CDMA (IS-95, IS-2000) and Universal Mobile Telecommunications System (UTMS), the latter of which is also known as W-CDMA. The Global System for Mobile Communications (GSM) model discussed above is an exemplary but not exclusive environment in which the present invention may be used.

B. Problems with Building a Sparse WLS

In a non-sparsed U-TDOA system (a U-TDOA system with 1 LMU per BTS), LMUs are able to detect and demodulate downlink signals (beacons or Broadcast Control Channels (BCCH)) from the resident cell. The measured timing is then compared to system time, determined by the LMU's GPS-based clock, and then sent to the SMLC for storage or forwarding to other LMUs. Each LMU will then be able quickly to demodulate uplink messaging since the channel and timeslot are provided in the location request and the frame timing offset from system time for each adjacent cell and sector is known.

In a sparsed U-TDOA system (a U-TDOA system with a less than 1 LMU per BTS deployment ratio), the increased distances between radio emitter (the mobile device) and the radio receiver (the LMU) resulting from the selective deployment ("sparsing") will have an adverse effect on U-TDOA location accuracy and will inhibit the LMU's ability to determine frame timing offsets, which are needed in a GSM environment. An LMU, to generate the timestamps needed for TDOA, should: (1) detect and demodulate cell downlink beacons to determine cell timing, and (2) detect and demodulate uplink signals. The requirements that the LMU receive and demodulate both uplink and downlink signals in the presence of noise, adjacent channel interference, co-channel interference and at the distance of several cell radii make it difficult to minimize LMU deployment cost.

SUMMARY

The following summary is intended to explain several aspects of the illustrative embodiments described in greater detail below. This summary is not intended to cover all inventive aspects of the disclosed subject matter, nor is it intended to limit the scope of protection of the claims set forth below.

In an overlay, U-TDOA-based, Wireless Location System, LMUs typically co-located with BTSs are used to collect radio signaling both in the forward and reverse channels. When LMUs are not deployed at each BTS site, a sparse deployment, beacon reception and uplink reception can limit the performance and service area of the U-TDOA system. A goal of the present invention is to provide a method and system for minimizing LMU deployment costs. Illustrative embodiments provide a number of techniques to minimize the cost of a U-TDOA deployment via sparsing. These techniques may be applied as shown in FIG. 3 to reduce the deployment ratio of LMUs to BTSs and thus the overall cost of the U-TDOA wireless location system.

The present invention may be embodied as an iterative method for designing a sparse wireless location system (WLS), and as a software tool for use in performing the iterative design method. For example, in one exemplary embodiment, the iterative method includes performing an intelligent network design process to produce an initial network design; performing a preliminary network design analysis to determine that at least one of the following performance limiting factors affects the initial network design: downlink beacon discovery, accuracy, and uplink demodulation; and modifying the initial network design based on the performance limiting factor determined as affecting the initial network design.

The WLS may comprise a U-TDOA system including a plurality of geographically dispersed location measuring units (LMUs), and the WLS may be overlaid on a GSM wireless communications system comprising a plurality of geographically dispersed base transceiver stations (BTSs). In addition, a presently preferred implementation of the iterative method further comprises identifying at least one cluster of co-synchronized cell sectors prior to performing the intelligent network design process.

In an illustrative embodiment, the method further comprises adding at least one LMU to the network design based on a determination that the performance limiting factor affecting the initial network design is accuracy. The illustrative embodiment may also include removing at least one LMU from the network design based on a determination that no performance limiting factor affects the initial network design.

When the performance limiting factor is downlink beacon discovery, the method may also include deploying at least one enhanced downlink antenna, deploying downlink interference cancellation, deploying BTS synchronization, adding at least one LMU to the network design, or a combination of any of these. In addition, when the performance limiting factor is downlink beacon discovery, the method may also include determining whether an Abis monitoring system (AMS) is deployed, and if not deploying at least one downlink-only LMU at an identified site. If an AMS is deployed, the method may include enabling the use of Enhanced Beacon Synchronization (EBS) and AMS-derived beacon timing functions.

When the performance limiting factor is uplink demodulation, the method may further include determining whether communications system demodulation data is enabled, and if so enabling a demodulated data feature, and if not determining that an AMS is not deployed and enabling a mid-amble only correction feature. In addition, if communications system demodulation data is not enabled, the method may include determining that an AMS is deployed and enabling an AMS-derived demodulated data feature. When the performance limiting factor affecting the initial network design is uplink demodulation, the method may further comprise adding at least one LMU to the network design, and/or adding dedicated antenna facilities. It should also be noted that obtaining the demodulation bits from a link monitoring system, e.g., an AMS, can reduce the cost and complexity of an LMU, i.e., even in non-sparsed environments.

Other aspects of the embodiments disclosed herein are described below.

BRIEF DESCRIPTION OF THE DRAWINGS

The foregoing summary as well as the following detailed description are better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Figure 1:
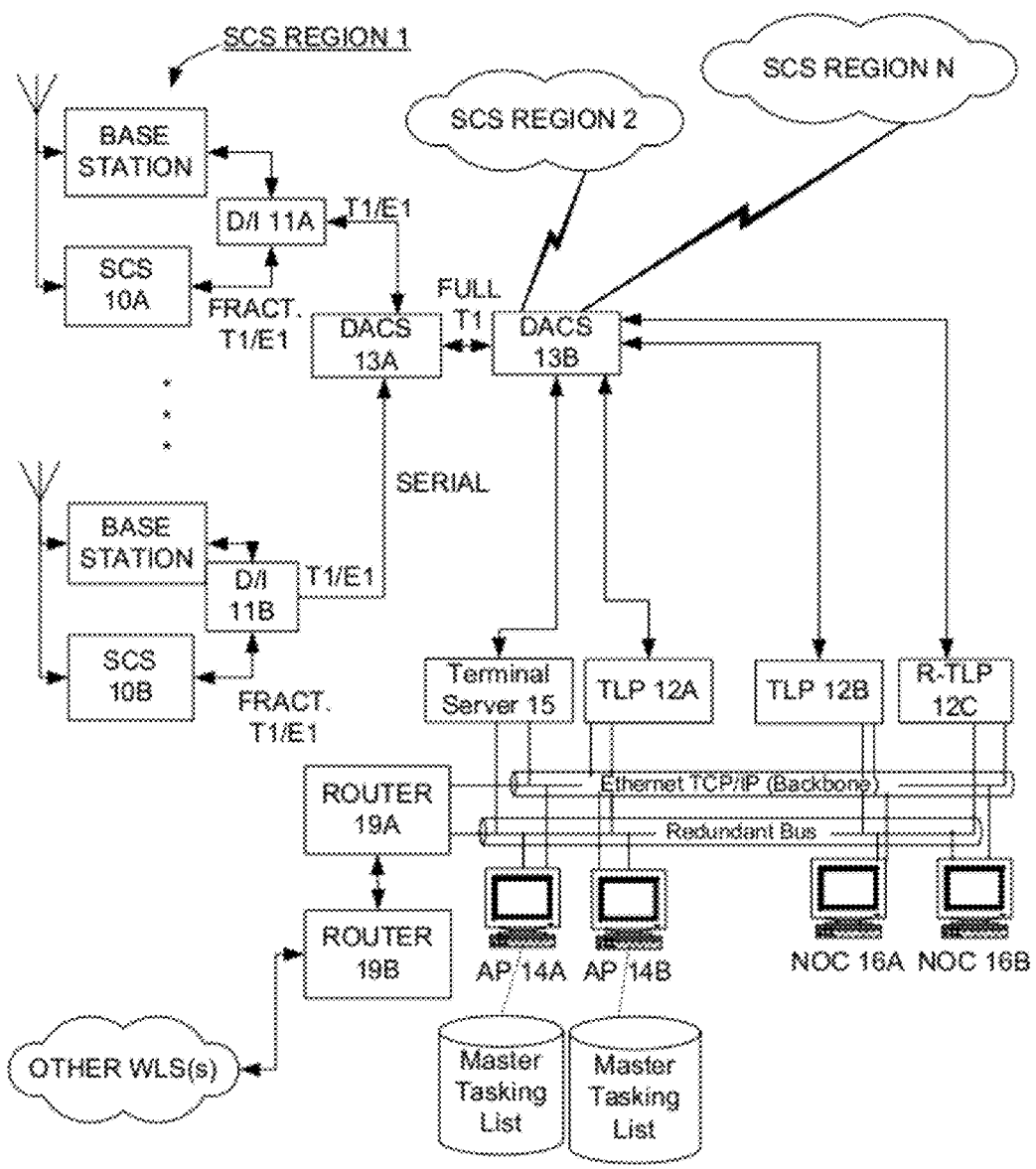
FIG. 1 schematically depicts a Wireless Location System.
Figures 1A, 1B:
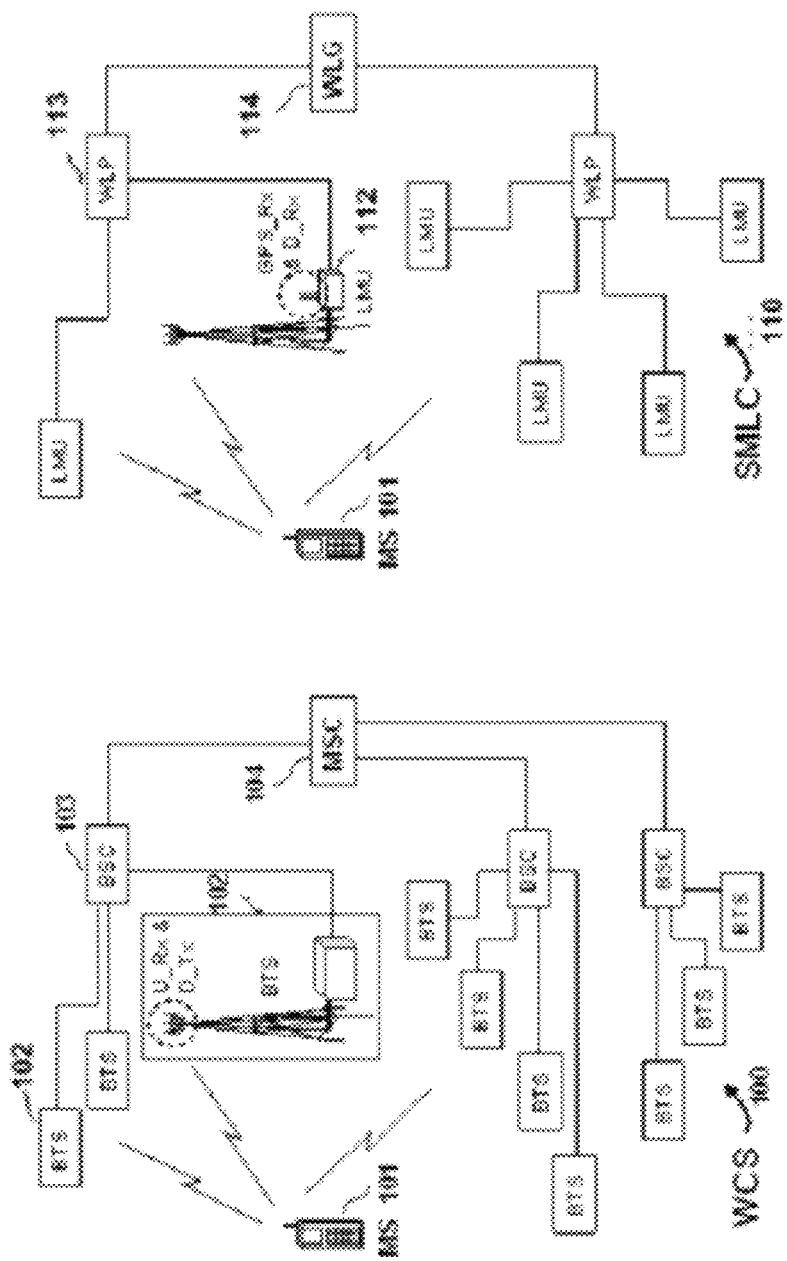
FIG. 1A depicts a representative configuration of the major components of a wireless communications system (WCS).
FIG. 1B shows a representative configuration of the major components of an overlay WLS, sometimes called the serving mobile location center (SMLC).

We will now describe illustrative embodiments of the present invention. First, we provide a detailed overview of the problem and then a more detailed description of our solutions.

A. Overview

In an effort to reduce the cost of a U-TDOA system, receivers may be installed at a subset of the cell sites in the communications network. As discussed above, in a U-TDOA system having one LMU per BTS, each LMU can detect and demodulate downlink beacons or Broadcast Control Channels (BCCH) from its resident cell (e.g., its co-located BTS). The measured timing may then be compared to system time as determined by the LMU's GPS-based clock, and then sent to an SMLC for storage or forwarding to other LMUs. This enables each LMU to demodulate uplink messaging.

In a sparse U-TDOA system (a U-TDOA system with a less than 1 LMU per BTS deployment ratio), the increased distances between radio emitter (the mobile device) and the radio receiver (the LMU) resulting from the selective deployment ("sparsing") will have an adverse effect on U-TDOA location accuracy as SNR decreases with distance, co-channel interference increases, and effects of GDOP are magnified. Additionally, in a sparsed U-TDOA system, LMUs are required not only to determine the radio signal timing of the resident cell and sectors, but also any surrounding cells and sectors that do not have a resident LMU. This ability to receive and demodulate the beacons of non-resident cells and sectors in proximity to the LMU is used to determine frame timing offsets.

The a priori knowledge of the frame timing is used for U-TDOA location of GSM devices such as mobile phones. Each GSM frequency channel is shared by up to 8 mobile stations. Since there are a maximum of eight users per frequency, there are eight timeslots (TS) per GSM frame. Therefore, each mobile uses the channel for one timeslot and then waits for its turn to come round again in the next frame. The mobile transmitter turns on only during its active timeslot. The requirement to transmit in a single timeslot and stay idle during the remaining seven timeslots results in very tight demands on the mechanism for on/off switching of the RF power. If a mobile station does not perform according to the specifications, it will disturb other mobile stations in adjacent timeslots and on adjacent channels. The WLS tasking information from a location request contains channel information, supplied by the wireless communications system or by added monitoring subsystems, that includes the timeslot assigned to the mobile-of-interest; but without the frame timing information derived from the beacon discovery process, there is no simple way for the LMU to reliably distinguish one timeslot from another.

The inability to detect the beacons from surrounding cells and sectors means that the frame timing cannot be derived in advance of a location request, thus the LMU location rate is severely reduced by the need to collect long periods of radio energy from the assigned channel, eliminating the ability of the WLS to perform most control channel locations and resulting in higher failed locations due to calls handing off during the signal collection phase of the U-TDOA location.

An LMU, to generate the timestamps needed for TDOA, should: (1) detect and demodulate cell downlink beacons to determine cell timing, and (2) detect and demodulate uplink signals. The downlink signals will be from adjacent cells and sectors and from those potentially able to be served by the LMU. The uplink signals can be destined for the resident cell or for any serving cells in near proximity, and can originate from any point served by those cells. The requirements that the LMU receive and demodulate both uplink and downlink signals in the presence of noise, adjacent channel interference, co-channel interference and at the distance of several cell radii make it difficult to minimize LMU deployment costs. A goal of the present invention is to provide a multi-pronged technique for minimizing such LMU deployment costs.

To summarize, beacon discovery is a problem due to:
Co-channel interference
Adjacent channel interference
Receiver saturation
Directional antennae deployments
Antenna Downtilt
Near-far effects.

When deploying LMUs in less than a 1:1 ratio to BTSs in GSM networks in urban areas, we have observed that the limiting factors are Beacon (BCCH) Discovery and Uplink Demodulation, and not location accuracy. Uplink Demodulation is a problem since the successful measurement of TDOA values relies upon a "clean" (high SNR, low phase noise, low interference, etc.) reference signal with which measured signals from multiple sites are correlated to provide an estimate of the TDOA between the reference signal and the signal received at each site (see U.S. Pat. Nos. 5,327,144; 6,047,192; 6,400,320; 6,483,460; and 6,661,379). In uplink demodulation limited areas, no signal of sufficient quality is available at any LMU to act as the reference signal.

Uplink demodulation is a problem due to:
Co-channel interference
Adjacent channel interference
Receiver saturation
Directional antennae deployments
Antenna Downtilt
Near-far effects
Path loss due to radiative propagation loss, signal absorption and diffraction losses, and multipath signal corruption.

TruePosition has developed a number of techniques to minimize the cost of a U-TDOA deployment via sparsing. These techniques are applied as shown in FIGS. 3A-3G to reduce the deployment ratio of LMUs to BTSs and thus the overall cost of the U-TDOA wireless location system. FIGS. 3A-3G are flowcharts of an exemplary implementation of a process in accordance with the present invention. The illustrated steps are summarized below.

Step 300: Begin sparsing design process.
Step 301: Identify clusters of co-synchronized cell sectors.
Step 302: Perform intelligent network design process.
Step 303: Perform preliminary network design analysis.
Step 304: Determine performance limiting factor:
(A) downlink beacon discovery—go to FIGS. 3B, 3C;
(B) accuracy—go to FIG. 3D;
(C) none—go to FIG. 3E, Remove LMU(s) (Step 321); or
(D) uplink demodulation—go to FIGS. 3F and 3G.

Figure 3A:
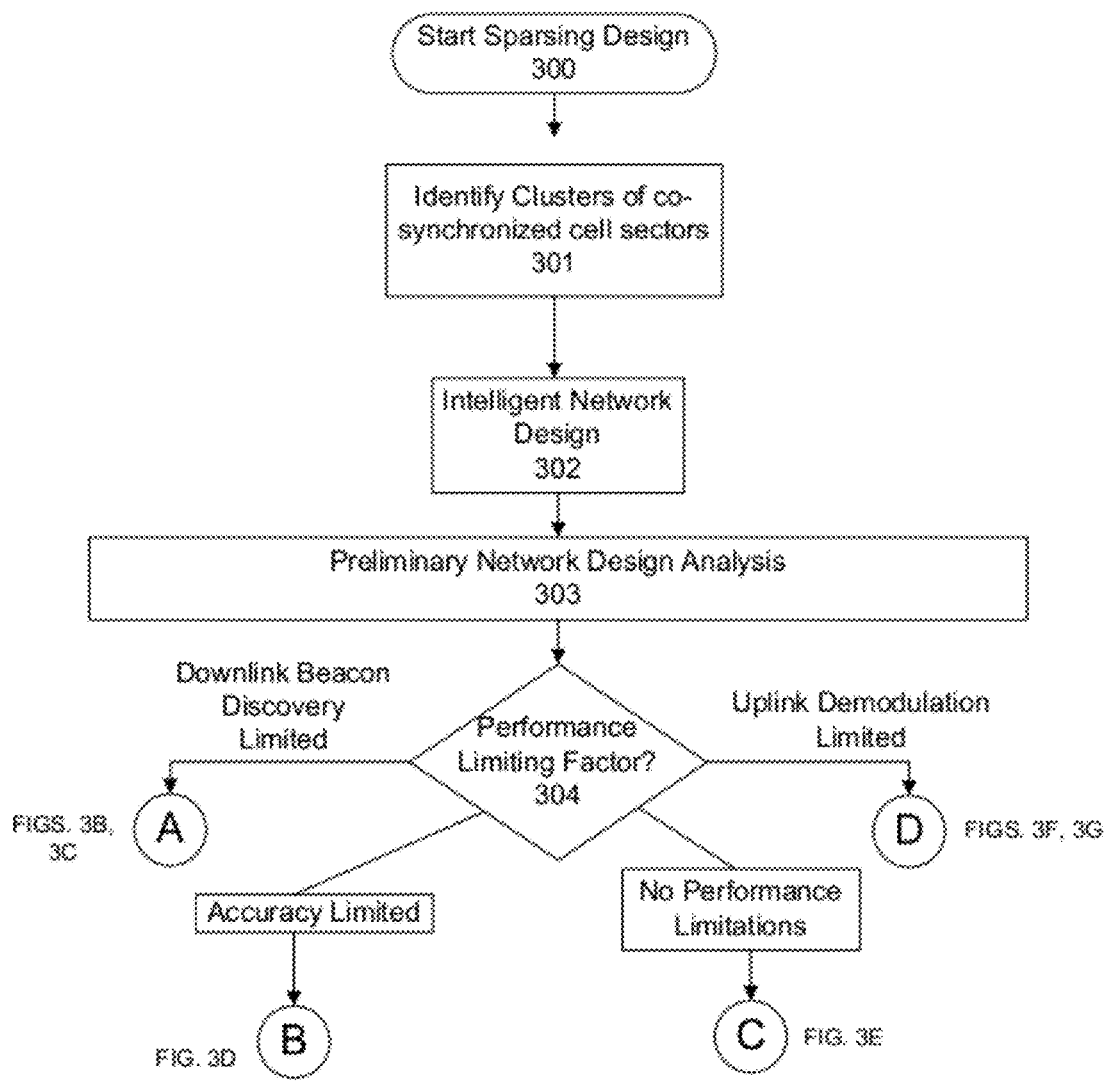
FIGS. 3A-3G are or provide a flowchart showing a progression of techniques that may be used to sparse a U-TDOA system based on the results of pre-installation analysis, simulation modeling and field determined empirical results.
Figure 3B:
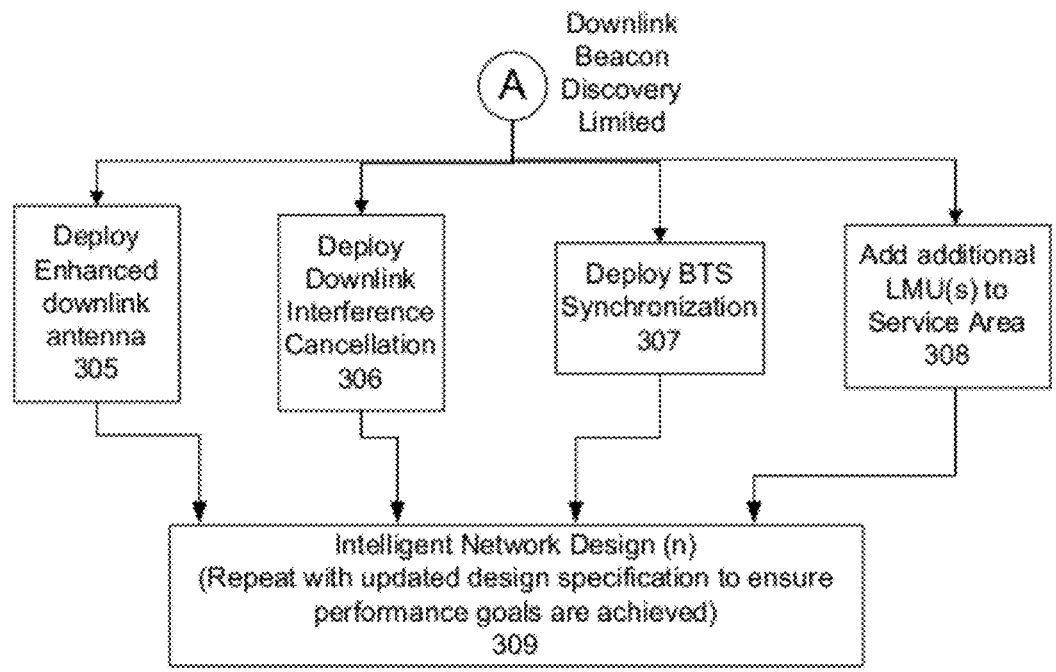

As shown in FIG. 3B, in a "downlink beacon discovery limited" situation, the following steps are carried out:
Step 305: Deploy enhanced downlink antenna.
Step 306: Deploy downlink interference cancellation.
Step 307: Deploy BTS synchronization.
Step 308: Add additional LMU(s) to the service area.

Figure 3C:
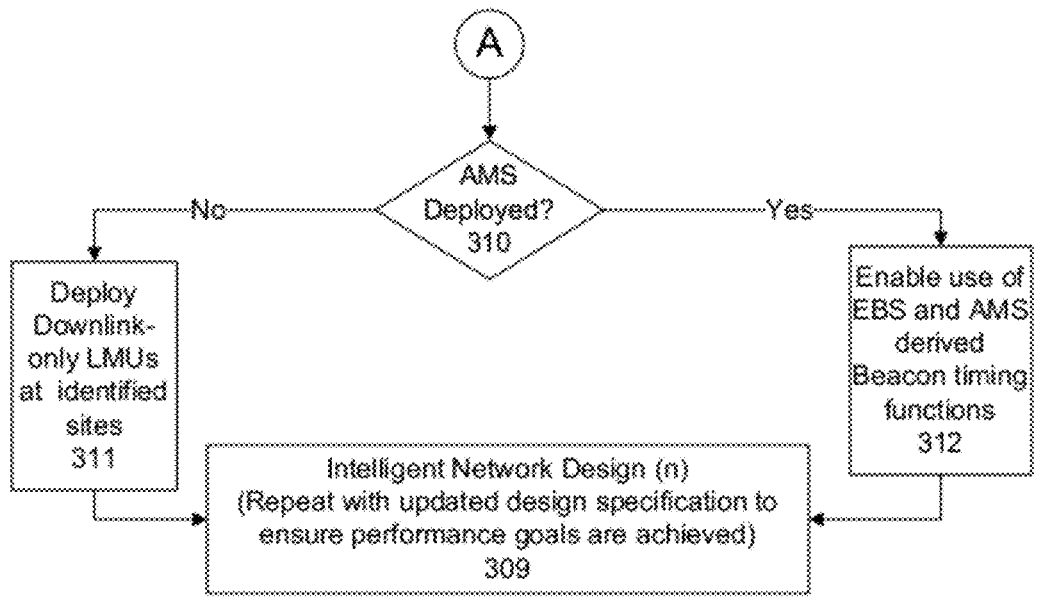

In addition, at Step 310, the process includes determining whether an AMS (Abis monitoring system) is deployed (see FIG. 3C). If not, it proceeds to step 311. If so, it proceeds to step 312.
Step 311: Deploy downlink-only LMUs at identified sites.
Step 312: Enable use of EBS (Enhanced Beacon Synchronization) and AMS-derived beacon timing functions.

As shown in FIGS. 3B and 3C, both of these processes are followed by Step 309: Perform intelligent network design process again, this time with updated design specifications.

Figure 3D:
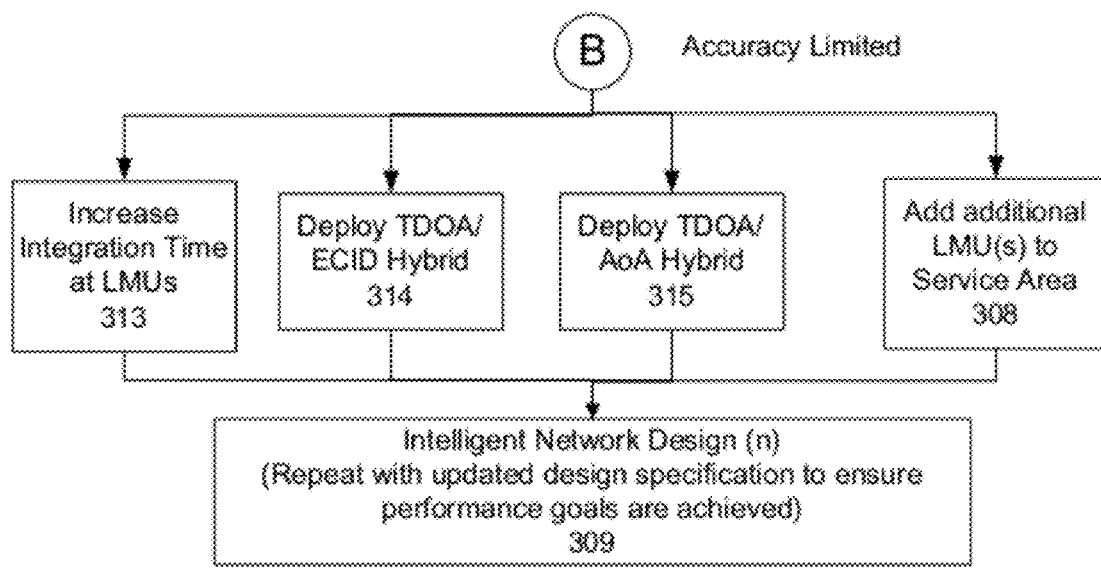

As shown in FIG. 3D, in an "accuracy limited" situation, the following steps are carried out:
Step 313: Increase Signal Integration Time;
Step 314: Deploy TDOA/ECID Hybrid;
Step 315: Deploy TDOA/AoA Hybrid;
Step 308: Add additional LMU(s) to Service Area.

Figure 3E:
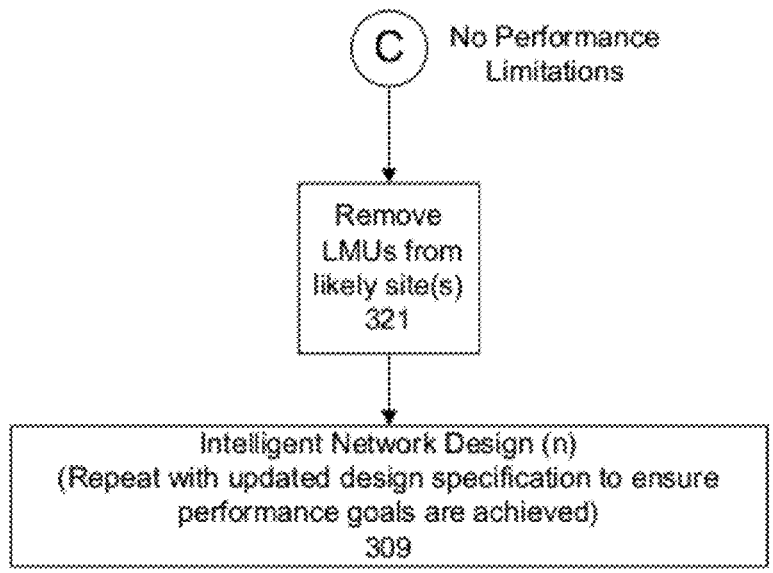
Figure 3F:
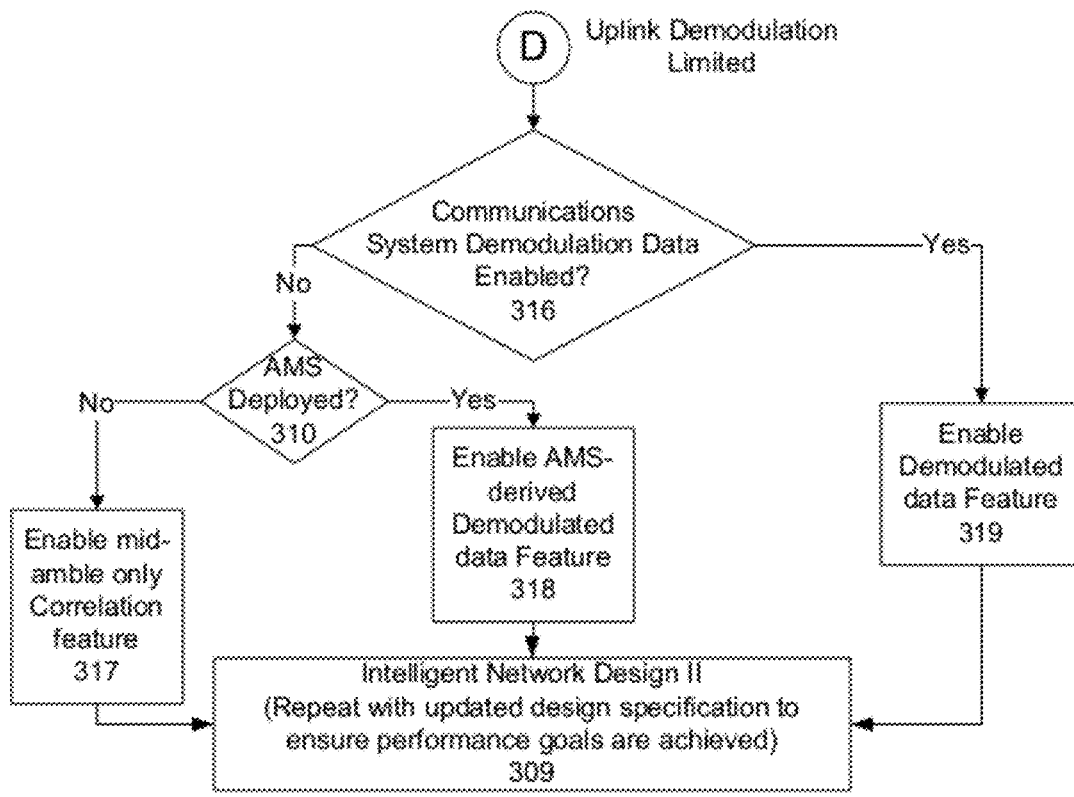
Figure 3G:
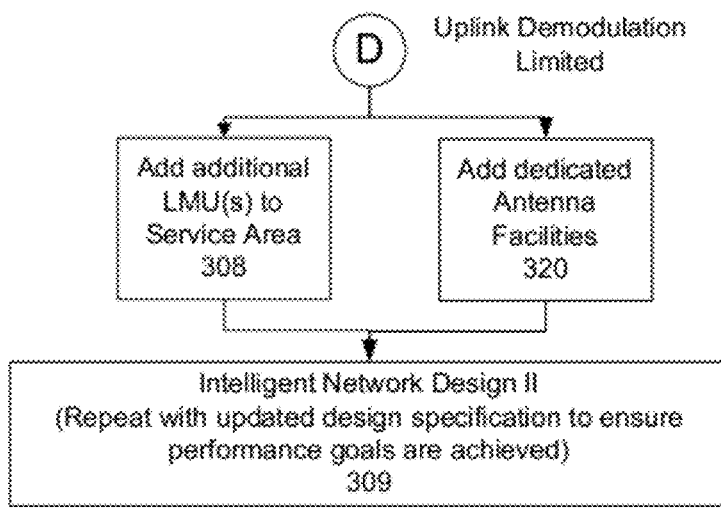

FIGS. 3F and 3G depict the process steps for the "uplink demodulation limited" scenario. The steps include:
Step 316: Determine whether communications system demodulation data is enabled. If not, go to Step 310; if so, go to Step 319.
Step 319: Enable demodulated data feature.
Step 317: Enable mid-amble only correction feature.
Step 318: Enable AMS-derived demodulated data feature. (Obtaining the demodulation data from an AMS can reduce the cost and complexity of the LMU. This is a benefit even when sparsing is not an issue.)

Also, as shown in FIG. 3G, for the "uplink demodulation limited" case, the process includes:
Step 308: Add additional LMU(s) to the service area.
Step 320: Add dedicated antenna facilities.

Here again, as shown in FIGS. 3F and 3G, these steps are followed by Step 309: Perform intelligent network design, with updated design specifications.

In subsection C., below, we will describe our inventive techniques in greater detail. First, however, we provide a non-limiting discussion of the GSM Reference Model, which provides an exemplary (although not exclusive) and suitable context in which embodiments of the present invention may be used.

B. GSM Network Reference Model

Figure 2:
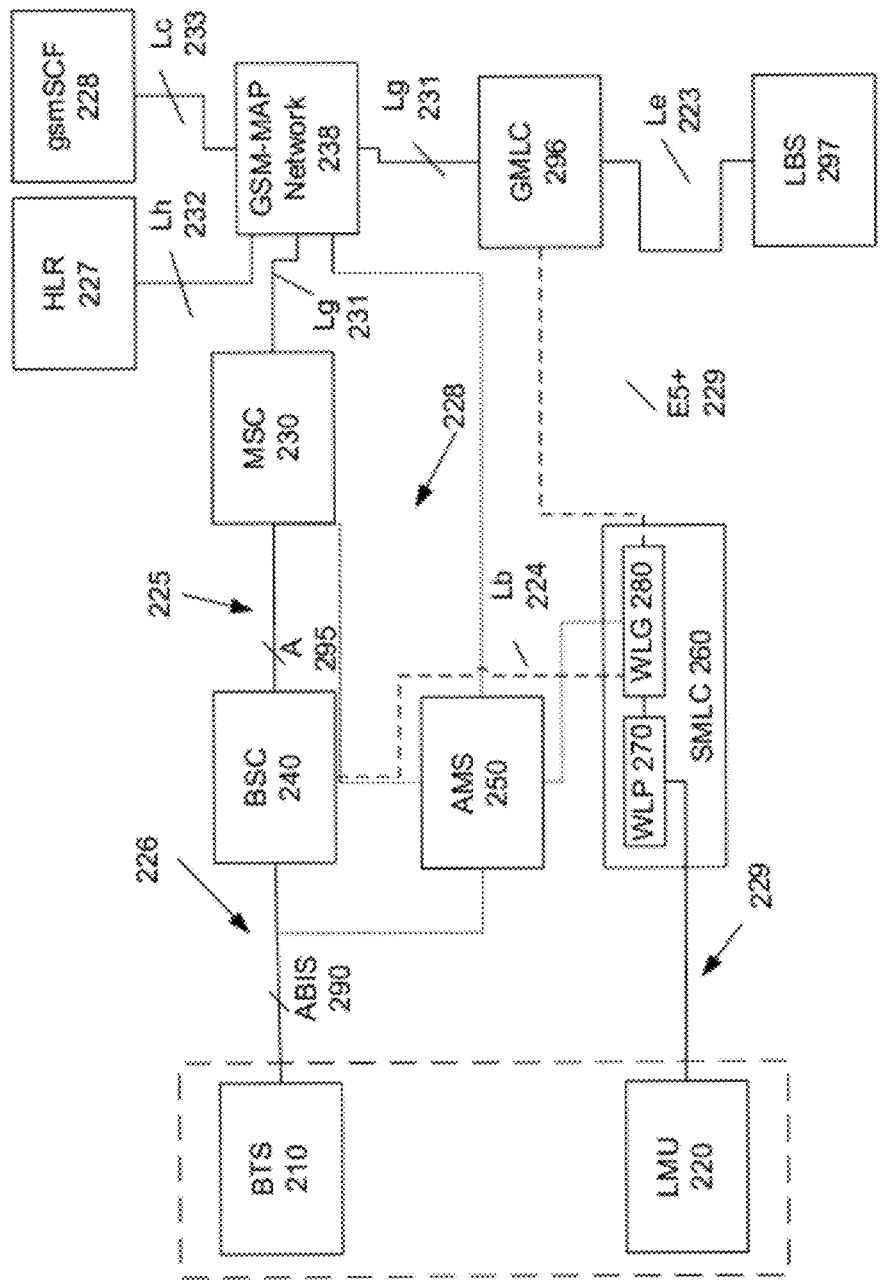
FIG. 2 schematically depicts a GSM/GPRS reference model.

FIG. 2 depicts a GSM Network Reference Model (this figure is a modification of the 3GPP standardized generic LCS logical architecture of GSM 03.71, Revision 8.9.0 section 5.6). We will now discuss this reference model in order to provide further context for the remaining description of presently preferred embodiments of our inventive technology. Our summary description of the GSM Network Reference Model is by no means intended to suggest that our invention is limited to systems conforming to the GSM Network Reference Model. The following paragraphs summarize the elements depicted in FIG. 2:

210 BTS—In a GSM system, the BTS (Base Transceiver Station) terminates the GSM radio interface. Each BTS includes a number of TRX (Transceivers), amplifiers, filters, and antenna. The term BTS includes the power, environmental shelter and environmental controls required to house electronic devices. The BTS connects to the MS (Mobile Station) via the Um radio interface and to the BSC via the Abis interface.

220 U-TDOA LMU—The LMU (Location Measurement Unit) makes radio measurements to support U-TDOA and is typically co-located with the BTS allowing for joint use of the radio antenna and facilities. All location and assistance measurements obtained by an LMU are supplied to a particular SMLC associated with the LMU. Instructions concerning the timing, the nature and any periodicity of these measurements are either provided by the SMLC or are pre-administered in the LMU. The geographically distributed U-TDOA LMU is connected to the SMLC by a dedicated connection.

223 Le Interface—The 3GPP standardized Le interface (The OMA/LIF Mobile Location Protocol 3.2.1 as standardized in 3GPP TS 23.171) is used by the LBS application (LCS Client) to communicate with the GMLC for requesting locations, and receiving location responses. Services provided include: Standard Immediate Location, Emergency Immediate Location, Standard Location Reporting, Emergency Location Reporting, and Triggered Location Reporting.

224 Lb Interface—The Lb interface is a standardized messaging interface that enables communication between a BSC and an SMLC. Through this interface, the GSM network triggers location requests directly to the WLS, which then obtains additional channel data from the BSC to complete the location process. This location information is then routed by the GSM network to the requesting or assigned LBS application. The Lb interface is available using either SS7 or SIGTRAN transport. The Lb interface is optional if the AMS with all associated interfaces and probes are installed. Both the AMS and Lb may operate in the same network.

225 A Passive Tap—The AMS is interfaced to the A interface via the use of passive taps. Typical implementation of the passive tap is by replication of the interface messaging via a Digital Cross-Connection or Digital Access Exchange (DAX).

226 Abis Passive Tap—The AMS is interfaced to the Abis interface via the use of passive taps. Typical implementation of the passive tap is by replication of the interface messaging via a Digital Cross-Connection or Digital Access Exchange (DAX).

227 HLR—The HLR (Home Location Register) is a database within the HPLMN (Home Public Land Mobile Network). The HLR is responsible for the maintenance of user subscription information. The HLR provides routing information for MT (Mobile Terminated) calls, SMS (Short Message Service). The HLR provides cell/sector information for location request routing and Any Time Interrogation (ATI) operations.

228 GSM SCF—The gsmSCF (GSM Service Control Function) defines the intelligent network (IN) control environment for every call that invokes an IN service. The gsmSCF also stores the service logic associated with IN services. For Location-based services, the gsmSCF uses the Lc interface for interconnection to the GSM MAP network. The Lc interface is applicable only in CAMEL phase 3 and 4. The procedures and signaling associated with the gsmSCF are defined in GSM 03.78 (now 3GPP TS 23.078) and GSM 09.02 (now 3GPP TS 29.002), respectively. Locations related to IN functions of the gsmSCF include interrogation on subscriber location using the ATI (Any Time Interrogation) and ALR (Active Location Retrieval) procedures.

229 E5+ Interface—The E5+interface 229 is based on the E5 interface described in the ANSI/ESTI standard J-STD-036 "Enhanced Wireless 9-1-1 Phase II". This interface between the SMLC's WLG component and GMLC, allows the GMLC to request location directly from the SMLC. The E5+ interface also allows the SMLC to push autonomously developed locations directly to the GMLC for caching or immediate delivery over the Le interface to an LBS application.

230 MSC—The MSC (Mobile Switching Center) contains functionality responsible for MS subscription authorization and managing call-related and non-call related positioning requests of GSM LCS. The MSC is accessible to the GMLC via the Lg interface and the SMLC via the Ls interface. If connected to SGSN through the Gs interface, it checks whether the mobile station is GPRS attached to decide whether to page the mobile station on the A or Gs interface.

231 Lg interface—The 3GPP standardized Interface between a GMLC (Gateway Mobile Location Center) and the VMSC (Visited Mobile Location Center).

232 Lh Interface—The 3GPP standardized Interface between a GMLC and the HLR. Communications using this interface take place over the GSM-MAP Network.

233 Lc Interface—The 3GPP standardized Interface between a GMLC and the gsmSCF communications using this interface take place over the GSM-MAP Network.

238 GSM MAP Network—The SS7-based network, using the MAP protocol, which enables real time access, routing, and communication between the distributed nodes of a mobile cellular network.

240 BSC—The BSC (Base Station Controller) is the functional entity within the GSM architecture that is responsible for RR (Radio Resource) allocation to a Mobile Station, frequency administration and handover between BTS controlled by the BSC. For a U-TDOA location system, the BSC supplies the SMLC with radio channel information and characteristics. The BSC is connected to the BTS via the Abis interface, the MSC via the A interface and to the SMLC via the Lb interface.

250 AMS—The AMS (A/Abis Monitoring Subsystem) is described in TruePosition's U.S. Pat. No. 6,782,264, Aug. 24, 2004, "Monitoring of Call Information in a Wireless Location System," and further expanded in U.S. Published Patent Application 20060003775, filed Jun. 10, 2005, "Advanced Triggers for Location-based Service Applications in a Wireless Location System." The AMS (or LMS) passively monitors the Abis and/or A interfaces for location triggering events, messaging and subscriber information allowing the SMLC to perform autonomous (from the perspective of the wireless communications system) U-TDOA, CGI, CGI+TA and ECID location calculations. The AMS is connected to the SMLC via a digital communications link. The AMS, with all associated interfaces and probes, is optional if the Lb interface is installed. Both the AMS and Lb may operate in the same network.

260 SMLC—The Serving Mobile Location Center (SMLC) contains functionality used to support LCS. In one PLMN, there may be more than one SMLC. The SMLC manages the overall coordination and scheduling of resources used to perform positioning of a MS. It also calculates the final location estimate and accuracy. The SMLC supports positioning via signaling on the Lb interface to the BSC serving the target MS. The SMLC may support the Lp interface to enable access to information and resources owned by another SMLC. The SMLC controls a number of LMUs for the purpose of obtaining radio interface measurements to locate or help locate MS subscribers in the area that it serves. The SMLC is administered with the capabilities and types of measurement produced by each of its LMUs. Signaling between the SMLC and U-TDOA LMU is transferred via a dedicated digital connection. A digital connection to the AMS and the E5+ interface to the GMLC allows the SMLC and LMUs to produce autonomous locations based on the AMS provided triggering and radio information and push autonomous locations to the GMLC.

270 WLP—The Wireless Location Processor (WLP) component of the SMLC cluster integrates information from the served LMUs to calculate the position of the caller or wireless device, using the single or multiple technologies as selected by the WLG. The WLP connects to the served LMUs and the WLP via digital communications links.

280 WLG—The Wireless Location Gateway (WLG) communicates with the wireless network, receiving requests for location, determining the best location method for the application, and sending the location record back to the network. The connection to the wireless network may be passive using the AMS or may be active, using the Lb interface interconnection to the BSC.

290 Abis—The Abis Interface is the GSM standardized signaling interface between the BTS and BSC.

295 A—The A interface is the standardized interface in the GSM network architecture between the BSC and an MSC. The interface supports channels for signaling and traffic.

296 GMLC—The GMLC (Gateway Mobile Location Center) contains the Authentication, Access Control, Administration and Accounting functionality used to support Location-based services (LBS) (also known as LCS (Location Services)). In one PLMN (Public Land Mobile Network), there may be more than one GMLC. The GMLC is the first node an external LBS or LCS client accesses in a GSM or UMTS network. The Gateway Mobile Location Center (GMLC) capabilities are defined in the following standards: GSM 03.71 (Location Services (LCS)—functional description), 3GPP TS 23.271 (Functional stage 2 description of LCS), Mobile Application Part Protocol (3GPP TS 09.02 "MAP") and CAMEL (3GPP TS 23.079). Additional functionality GMLC functionality includes:

Location Client Control Function (LCCF): The Location Client Control Function (LCCF) manages the external interface towards multiple Application Server/Location Client Function (LCF). The LCCF identifies the LCS client within the wireless operator by requesting client verification and authorization (i.e. verifies that the LCS client is allowed to position the subscriber) through interaction with the Location Client Authorization Function (LCAF). The LCCF handles mobility management for location services (LCS) e.g., forwarding of positioning requests to VLR. The LCCF determines if the final positioning estimate satisfies the QoS for the purpose of retry/reject. The LCCF provides flow control of positioning requests between simultaneous positioning requests. It may order the Location Client Coordinate Transformation Function (LCCTF) to perform a transformation to local coordinates. It also generates charging and billing-related data for LCS via the Location System Billing Function (LSBF).

Location Client Authorization Function (LCAF): The Location Client Authorization Function (LCAF) is responsible for providing access and subscription authorization to a client. Specifically, it provides authorization to a LCS client requesting access to the network and authorizes the subscription of a client. LCAF provides authorization to a LCS client requesting Location Information of a specific MS.

Location System Billing Function (LSBF): The Location System Billing Function (LSBF) is responsible for charging and billing activity within the network related to location services (LCS). This includes charging and billing of both clients and subscribers. Specifically, the LSBF collects charging related data and data for accounting between PLMNs.

Location System Operations Function (LSOF): The Location System Operations Function (LSOF) is responsible for provisioning of data, positioning capabilities, data related to clients and subscription (LCS client data and MS data), validation, fault management and performance management of the GMLC.

Location Client Coordinate Transformation Function (LCCTF): The Location Client Coordinate Transformation Function (LCCTF) provides conversion of a location estimate expressed according to a universal latitude and longitude system into an estimate expressed according to a local geographic system understood by the LCF and known as location information. The local system required for a particular LCF would either be known from subscription information or explicitly indicated by the LCF.

297 LBS—The LBS application (LCS Client) can initiate location requests to the GMLC and receive location responses from the GMLC. When an AMS has been deployed as part of the WLS, the LBS application may be allowed to pre-configure triggering events, messaging, or subscriber information on the AMS to enable autonomous passive location.

C. Implementing a Sparse U-TDOA Network

To deploy LMUs at the minimum number of sites while retaining a designated level of U-TDOA performance, the sparsing process shown in FIGS. 3A-3G may be performed. In the following subsections, we address the following topics in greater detail: base station timing analysis; intelligent system design for sparsing; predicted coverage area, predicted site density, and predicted area of responsibility; downlink coverage requirements and secondary sector coverage requirements; preliminary system design for sparsing analysis; downlink beacon discovery limited performance; uplink demodulation limited performance; improving downlink beacon discovery limited performance, enhanced downlink antenna for improving downlink beacon discovery limited performance, and link monitoring for improving downlink beacon discovery limited performance; enhanced beacon sync; downlink only LMU deployments; improving uplink demodulation limited performance, link monitoring for improving uplink demodulation limited performance, known sequence correlation for improving uplink demodulation limited performance; and alternative embodiments.

Base Station Timing Analysis (See Step 301 in FIG. 3A)

Once the performance parameters have been established and the relevant wireless system data has been collected, but before the preliminary system design can be completed, the wireless network timing sources should be evaluated. In a TDMA-based system, such as GSM, base transceiver stations (BTSs) are normally unsynchronized, i.e., base stations are deployed without a common clock reference. The accuracy requirements for GSM base transceiver stations were formulated by the ETSI organization (European Telecommunications Standards Institute) in the GSM 05.10 recommendation "Radio subsystem synchronization" as follows:

> 5.1 The BS shall use a single frequency source of absolute accuracy better than 0.05 parts-per-million (ppm) for both RF frequency generation and clocking the time base. The same source shall be used for all carriers at the BS.

As a result of this requirement, channels internal to a single CGI are synchronized. (A CGI can be a cell—in the case of an omni-directional antenna, or a sector of a cell—in the case of directional antennas.) Due to the difficulty of large scale geographical BTS deployments based on a common system clock reference, no requirement exists for synchronization of channels between other GSM BTSs. GSM base stations have traditionally derived their required frequency accuracy by locking a crystal oscillator within the base station to a recovered clock signal from a T1/E1 line backhaul facility. Timing signals based on a primary reference source (PRS) transmitted over the backhaul keep the embedded oscillator calibrated to within sufficient accuracy.

Although not a GSM requirement, due to equipment deployments and design choices by manufacturers, clusters of commonly timed, co-synchronized sectors and occasionally adjacent cells may exist in the wireless location system's service area. Also not required by the GSM specification but widely available to GSM operators after the introduction of the U.S. Air Force deployment of the NavStar Global Position System (GPS) satellite navigation system, GSM systems can be made co-synchronous by timing derived from the GPS radio signal and messaging. Equivalent timing abilities are expected to be available from any global or regional satellite navigation system.

Further information concerning BTS synchronization may be found in International Patent Application WO06088472A1, filed on Apr. 25, 2005, "Base Transceiver Station (BTS) Synchronization." This document describes how, in a network overlay wireless location solution for a GSM or UMTS communications network, spectrum utilization can be made more efficient by synchronizing the BTSs, which can require distributing a timing signal to all BTSs, or installing a satellite-based timing unit in each site. In an example of this solution, LMUs are installed at some or all of the BTS sites for the purpose of locating wireless devices. The LMUs are used to measure the timing of various uplink and/or downlink signals in the cellular network in support of various location techniques. These LMUs may include a GPS-based timing reference module, which may be used to synchronize the time bases of all LMUs. To reduce the overall cost of BTS synchronization, the LMU distributes timing signals, including a periodic electrical pulse as well as time description information, on a serial or other interface, which is available for other nodes to use for synchronization. The format of the electrical pulse and time description information is modified through hardware and software to adapt to the various formats required by various BTS types. For example, BTSs with co-located LMUs can receive a synchronization signal with little or no hardware cost. An External Interface Unit (EIU) may be used to adapt to various BTS hardware formats. For BTS sites not equipped with an LMU, a Timing Measurement Unit (TMU) can be used. The TMU has the single function of providing BTS time signals in the same formats as provided by the LMUs. The time signals provided by the TMUs are synchronous to the signals provided by the LMUs. This timing-only TMU has a lower cost than the LMU because it does not support the uplink or downlink signal measurement functions. This approach allows a cellular operator to synchronize BTSs at a relatively low cost.

Once the timing analysis of the BTSs and thus the radio channels in the service area has been completed, a map of downlink channel framing can be created. When the overall service area timing analysis is complete, a preliminary deployment design can be performed.

Intelligent System Design for Sparsing (See Step 302 in FIG. 3A)

TruePosition, Inc., the assignee of the present invention, makes an Intelligent System Design tool. The system planning application provides automated LMU site selection during the market design process. This feature incorporates criteria-based selection of LMU sites in a market with less than a 100% deployment ratio of LMUs to BTSs (a "sparsed" system).

The Intelligent System Design tool automatically selects the set of LMU sites that will provide the best location performance. To do this, the system planning software tool orders carrier base stations by redundancy metrics, and then removes one site at a time with the lowest redundancy metric, unless downlink coverage requirements or secondary sector coverage requirements are not satisfied for that site. Redundancy metrics are recalculated after each removal. Removal of sites continues until a target LMU deployment ratio is achieved or until the site pool is exhausted.

A redundancy metric for a site is obtained by multiplying several basic metrics for a site:

Redundancy Metric=(Coverage Area)$^K$(Site Density)$^L$ (Area of Responsibility)$^M$ where $K$=0.5, $L$=1, $M$=1.

Note that the constants K, L, and M have been determined empirically.

Coverage Area: A base station coverage area is an approximate area in square kilometers where the base station sectors can be used as cooperators in a WLS. The area is computed by finding a distance where certain threshold power is achieved. The power computation is based on a sophisticated radio propagation/path loss model (such as the extended COST231-Hata model). Therefore, the antenna parameters that contribute to coverage area computations are:
  height (agl) (the higher the site the better coverage)
  height above mean sea level (amsl) (used to come up with effective height)
  vertical beam width (the less the value the better coverage)
  horizontal beam width
  tilt (the closer to 0 the better, tilt of 10 can severely reduce coverage, for example)
  antenna gain (the more the gain the better coverage)
  number of sectors.
  The antenna parameters are necessary to account for individual properties of antennas.

Site Density: The site density is an average number of sites per square kilometer in the vicinity of a base station of interest. This value takes into consideration only sites that are closer than R kilometers from a base station. The R is chosen as a distance to a $20^{th}$ closest site. For the system planning tool computations only initial (before any removal) site densities are used. The initial site density correlates with the environment where base station is installed. For example, urban, suburban, and rural environments will have different site densities.

Area of Responsibility: This is the area that bounds a region (a Voronoi region), each point of which is closer to the current base station than to any other base station. Area of responsibility is recalculated after each base station removal from a configuration. This recalculation facilitates uniform distribution of sites and better geometry of cooperators for the U-TDOA calculation.

Downlink coverage requirements: The Intelligent System Design tool should make sure that after removal of an LMU from a carrier's site map, the site's downlink channel(s) can still be well monitored by downlink antennas installed on remaining LMU sites. These requirements include minimum downlink SNR that can include some safety margin and minimum number of downlink antennas that should be able to monitor calls handled by a non-LMU tower. To check these requirements the tool uses a Propagation Model that accounts for terrain loss. The program, depending on co-synchronous setting of the network, interprets the requirements differently. In a network that is generally unsynchronized (for example GSM), if two or more cell sectors (CGIs) are synchronized such that they have the same relative frame timing and frame numbers, then those cell sectors are said to be co-synchronous. This is sometimes present in GSM networks by making all cell sectors at a given site (typically 2, 3, or 6) co-synchronous to each other.

Secondary sector coverage requirements: A "secondary sector" is a sector/CGI other than the serving sector that may still be capable of demodulating the uplink signal from the mobile station. The primary and secondary sectors are all tasked with demodulation of the uplink signal to provide redundancy. Secondary sector coverage requirements make sure that in each representative point of an accuracy grid one can find a sufficient number of secondary sectors. These requirements include minimum SNR to be a secondary, and percentages of points that have 0, 1, 2 and 3 secondary sectors. To check these requirements the Intelligent System Design tool uses an original Propagation Model that accounts for terrain loss and carrier supplied coverage polygons. The Intelligent System Design tool allows the operator to create an a priori U-TDOA system design (the baseline design) that uses less than one LMU per site. This allows the Operator to deploy the minimum number of LMUs for any required level of accuracy and save costs associated with un-needed LMU deployments.

Initial Baseline Design (FIG. 3A, Steps 300, 301, 302)

The Intelligent System Design tool is the tool that defines which sites can be left un-deployed in a sparse LMU deployment scenario.

With a desired sparing target deployment ratio (a ratio of less than one LMU per base station), the Intelligent System Design tool will be used to identify the sites that should be deployed with those LMUs to achieve the best system performance resulting in a system design. This design is called the initial baseline design. This initial baseline design may contain areas that are beacon discovery limited, uplink demodulation limited or accuracy limited. In each iteration of the sparsing design process, a new candidate design is developed.

The Intelligent System Design tool works by creating, for every point in the geographic service area, the set of TDOA baselines from every potential LMU site within or in proximity to the service area. The number of potential TDOA baselines for any point using the LMUs potentially involved in a TDOA location (as determined by the predicted received signal strength from the radio propagation model) is given by the formula:

Maximum No. of TDOA Baselines=(No. of LMUs)* (No. of LMUs−1)*(½), when (No. of LMUs)≧3

The factor that is limiting the deployment ratio of a network can be identified in a progression of steps.

The first item to check is downlink beacon discovery. This can be analyzed by considering the transmit power of each beacon and the path loss of the downlink signal from the transmit antenna to each site that is a candidate to have an LMU deployed. This will yield a received power level at each LMU. Based on the receiver sensitivity characteristics, it can be determined whether or not each LMU can discover a given downlink beacon. As long as every beacon can be discovered by at least one LMU (or more if redundancy is required), then the design is not downlink beacon discovery limited. If any beacon cannot be discovered by at least one LMU, then the system design is limited by this factor, and LMUs should be added to this design until this situation is resolved.

Once all the beacons can be discovered by at least one LMU, the next limiting factor, Uplink Demodulation, can be assessed. Based on the receiver sensitivity of the base station, and the path loss to different areas served by that site, the minimum transmit power of the mobile uplink signal needed to maintain this link can be determined at each location. Based on this mobile uplink transmit power, and similar path loss calculations, the received power level at surrounding LMU sites can be determined. If this received power is greater than the minimum signal strength needed by the LMU to demodulate the signal at at least one site that is a candidate to have an LMU deployed, then the system design is not Uplink Demodulation limited. If there are areas where the mobile can be served by a cell site, but the uplink signal does not propagate to any LMU site with sufficient power levels to allow demodulation, then the system is Uplink Demodulation limited, and LMUs should be added to this design until this situation is resolved.

Once all the beacons have been discovered, and all areas serviceable by the cell sites in the design can also be demodulated by the deployed LMUs, a final check can be made to determine if the system design is Accuracy limited. This entails first determining the minimum mobile uplink transmit power used to maintain the link at the locations served by the cell sites in the design. From this transmit power, and the path loss to all surrounding LMU sites, the received signal power at each of the surrounding LMUs can be determined. If this signal level is greater than the TDOA detection sensitivity level, which is significantly lower than the Demodulation sensitivity level, then that LMU is considered a cooperating LMU for the location of mobiles from this area. All such cooperating LMUs are identified. The terrain and density of sites in the region are used to estimate the multi-path induced spread in the TDOA measurements. Based on the geometry of these cooperating LMUs, and the multi-path spread, the estimated location accuracy for this area can be computed. This process is repeated for all the areas served by the cell sites in the design to produce an aggregate location accuracy for the entire design. If this accuracy level meets the requirements of the design, then the system design is not Accuracy limited. If the estimated accuracy level falls short of the requirements of the design, then the system is Accuracy limited and additional LMUs should be added to this design until this situation is resolved.

Revising the Initial Baseline Design (FIG. 3A, Step 303)

Introduction: Adding LMUs to the WLS Candidate Design

If the initial baseline design or candidate design contains areas within the defined service area with the defined geographic service area that are beacon discovery limited, uplink demodulation limited or accuracy limited, then the initial or current sparsing ratio should be decreased and LMU added to the initial baseline design.

Adding LMUs is performed on an LMU-by-LMU basis. First, the performance limitation and the geographic area that is performance limited is identified. The available base stations not currently hosting LMUs are identified with the affected area or in geographic proximity to the affected area are noted (if no unused base station is available in the affected area, alternative siting arrangements, for example cell sites used by other wireless carriers or other radio services, can be considered). For each of these potential sites, the system tool will be used identify the next best site for an LMU to be added using the techniques described.

Adding LMU(s) for Beacon Limited (FIG. 3B, Step 308)

When an area is beacon limited, the system planning tool is used to predict the beacon discovery list for each potential LMU site. Each potential LMU site's predicted beacon discovery list is then compared with the list of beacons that are not predicted to be discovered by the existing LMU population. LMUs are added to the design until all beacons are discoverable and the amount of redundancy (the number of times a beacon is discovered by multiple LMUs) in the beacon list is minimized.

Adding LMUs for Uplink Demodulation Limited (FIG. 3G, Step 308)

When an area is Uplink Demodulation Limited, the system planning tool is used to predict the uplink demodulation performance for each potential LMU site. Each potential LMU site's predicted uplink demodulation area is then compared with area not sufficiently covered by the existing LMU population. LMUs are added to the design until the area that was uplink demodulation limited is eliminated and any overlapping coverage from the LMUs in proximity to the affected area is minimized.

Adding LMUs for Accuracy Limited (FIG. 3D, Step 308)

When an area is Accuracy Limited, the system planning tool is used to predict the improvement in system accuracy performance for each potential LMU site. On a site-by-site basis, the system planning tool develops an accuracy prediction for the entire service area based on that site being added to the entire LMU population already present in the current candidate design. If addition of a single site does not improve accuracy performance sufficiently, the process is repeated for each pair of potential LMU sites. This process of adding LMUs and evaluation of the predicted accuracy in each new potential network design is repeated until the accuracy performance threshold is reached or until all potential LMU sites are occupied by LMUs.

If the list of potential LMU sites are exhausted, then additional alternative siting arrangements, for example cell sites used by other wireless carriers or other radio services or standalone LMU sites with dedicated facilities, can be considered.

Introduction: Removing LMUs from the WLS Design (FIG. 3E, Step 321)

If the initial baseline design of candidate design does not contain areas within the defined geographic service area that are beacon discovery limited, uplink demodulation limited or accuracy limited, then the sparsing ratio may be able to be increased and LMU(s) removed from the initial baseline design or candidate design.

To delete LMUs from a design, the system planning tool will be used identify the next best LMU to remove. All LMUs in the candidate design are considered. The decision to remove an LMU from the initial baseline design is based on redundancy—for both beacons and accuracy.

Removing LMU(s) without Degrading Beacon Limited Performance

The first step in determining potential LMUs for removal from the design is examination of the beacon lists for each LMU in the design. The system planning tool is used to predict beacons that would be discovered by each LMU. The system planning tool is then used to determine if any of the predicted beacons are predicted to be discovered by other LMUs. If all the beacons discovered by an LMU are also discovered by others, then this LMU is a candidate to be removed. It is the level of beacon redundancy determines which LMU get removed first from the design. The removal of LMUs from the design can be repeated, barring the introduction of the other sparsing related performance issues (accuracy, uplink demodulation, etc.) until redundancy of beacon discovery is minimized. In an ideal, maximally sparsed system, there would be no beacon redundancy.

Please note that the determination of beacon redundancy can be performed in a deployed system from examination of the LMU received beacon list and in cases of system optimization or wireless network reconfiguration, the actual beacon performance can be used in place of that determined from the theoretical propagation model.

Removing LMU(s) without Degrading Uplink Demodulation Performance

The next step in determining potential LMUs for removal from the design is examination of the uplink signal strengths for each LMU in the design.

The identification and LMUs that can be removed from the updated design based on Uplink Demodulation Performance is done using the radio propagation model created for the initial baseline design, already altered to reflect the removal of LMUs based on redundancy in beacon discovery. This updated model has minimized the beacon discovery redundancy and initially has no Uplink Demodulation Performance limited areas.

The received signal strengths at all LMUs for all possible transmission points in the service area are examined in this stage. If successful (strong enough to be demodulated) signal reception is predicted at two or more LMUs, then reception is said to be redundant. If the set of signals predicted to be received and demodulated by a specific LMU are completely redundant, that LMU may be removed from the current design barring the introduction of the other sparsing related performance issues (accuracy and beacon discovery).

Please note that the determination of Uplink Demodulation redundancy can be performed in a deployed system from examination of the LMU received signal records and in cases of system optimization or wireless network reconfiguration, the actual uplink demodulation performance can be used in place of that determined from the theoretical propagation model.

Removing LMU(s) without Degrading Accuracy Performance

Accuracy limited should be thought of in terms of meeting certain targets (e.g., the FCC Phase II mandate for network-based location system) for accuracy numbers. The system is accuracy limited if the current design does not meet the required accuracy targets. I.e., additional sparsing by removal of LMUs from the candidate design cannot be done because accuracy requirements are not being met.

In a sparsed WLS, not limited by Beacon discovery or Uplink Demodulation performance, the primary determinant of Accuracy Limited areas is the Horizontal Geometric Dilution of Precision (HDOP or GDOP)

A relationship exists between the location error, measurement error and geometry. The effect of the geometry is represented by a scalar quantity that acts to magnify the measurement error or dilute the precision of the computed result. This quantity is referred to as the Horizontal Dilution of Precision (HDOP) and is the ratio of the Root-Mean-Square (RMS) position error to the RMS measurement error $\sigma$. Mathematically, it can be written as:

$$HDOP = \sqrt{\frac{\sigma_n^2 + \sigma_e^2}{\sigma^2}}$$

where $\sigma_n^2$ and $\sigma_e^2$ is the variances of the horizontal components from the covariance matrix of the measurements. Physically, the best HDOP is realized when the intersection of the TDOA hyperbolas between baseline LMU pairs is orthogonal. An ideal HDOP situation arises when the emitter is at the center of a circle and all of the receiving sites are uniformly distributed about the circumference of the circle.

Determination of likely LMUs for removal in a candidate system that meets or exceeds accuracy requirements is done through the examination of the system planning tool generated accuracy plots of the service area and the TDOA baselines, between each pair of LMUs, generated for each point in the service area.

The system planning tool considers both the redundancy in predicted TDOA hyperbolic baselines and the degree of orthogonality in the baselines. Redundant baselines do not contribute to increased accuracy and therefore can be eliminated. Baselines with low degrees of orthogonality can actually magnify the inaccuracy of a measurement and must therefore be minimized. If an LMU produces TDOA hyperbolic baselines with low degrees of orthogonality, it can be removed and the WLS accuracy performance recalculated.

Please note that evaluation of the accuracy performance of a deployed system can be determined from examination of calculated location versus known actual location for test transmissions. In cases where a deployed system is suffering from accuracy limited areas, that information can be brought into the radio propagation model and a new baseline design calculated. From the new baseline, the entire intelligent design process can be reiterated and potential sites for the addition or deletion of LMUs determined.

Preliminary System Design for Sparsing Analysis (See Step 303 in FIG. 3A)

The preliminary system design for sparsing analysis is used to determine if TDOA performance limiting factors exist for the intelligent system design produced by the design planning and evaluation application. The ability to deploy LMUs in a less then one-to-one ratio to the cell sites in a network (sparse deployment) is limited by three main factors: Downlink Beacon Discovery, Uplink Demodulation, and Accuracy. These are represented in FIGS. 3B-C (Downlink Beacon Discovery Limited), FIGS. 3D-E (Accuracy Limited), and FIGS. 3F-G (Uplink Demodulation Limited).

The factor that is limiting the deployment ratio of a network can be identified in progressive steps.

The first item to check is the downlink beacon discovery. This can be analyzed by considering the transmit power of each beacon, the path loss of the downlink signal from the transmit antenna to each site that is a candidate to have an LMU deployed. This will yield a received power level at each LMU. Based on the receiver sensitivity characteristics, it can be determined whether or not each LMU can discover a given downlink beacon. As long as every beacon can be discovered by at least one LMU (or more if redundancy is required), then the design is not downlink beacon discovery limited. If any beacon can not be discovered by at least one LMU, then the system design is limited by this factor, and LMUs should be added to this design until this situation is resolved.

Once all the beacons can be discovered by at least one LMU, the next limiting factor, Uplink Demodulation, can be assessed. Based on the receiver sensitivity of the base station, and the path loss to different areas served by that site, the minimum transmit power of the mobile uplink signal needed to maintain this link can be determined at each location. Based on this mobile uplink transmit power, and similar path loss calculations, the received power level at surrounding LMU sites can be determined. If this received power is greater than the minimum signal strength needed by the LMU to demodulate the signal at at least one site that is a candidate for to have an LMU deployed, then the system design is not Uplink Demodulation limited. If there are areas where the mobile can be served by a cell site, but the uplink signal does not propagate to any LMU site with sufficient power levels to allow demodulation, then the system is Uplink Demodulation limited, and LMUs should be added to this design until this situation is resolved.

Once all the beacons have been discovered, and all areas serviceable by the cell sites in the design can also be demodulated by the deployed LMUs, a final check can be made to determine if the system design is Accuracy limited. This requires first determining the minimum mobile uplink transmit power used to maintain the link at the locations served by the cell sites in the design. From this transmit power, and the path loss to all surrounding LMU sites, the received signal power at each of the surrounding LMUs can be determined. If this signal level is greater than the TDOA detection sensitivity level, which is significantly lower than the Demodulation sensitivity level, then that LMU is considered a cooperating LMU for the location of mobiles from this area. All such cooperating LMUs are identified. The terrain and density of sites in the region are used to estimate the multi-path induced spread in the TDOA measurements. Based on the geometry of these cooperating LMUs, and the multi-path spread, estimated location accuracy for this area can be computed. This process is repeated for all the areas served by the cell sites in the design to produce aggregate location accuracy for the entire design. If this accuracy level meets the requirements of the design, then the system design is not Accuracy limited. If the estimated accuracy level fall short of the requirements for the design, then the system is Accuracy limited and additional LMUs should be added to this design until this situation is resolved.

Downlink Beacon Discovery Limited

Figure 4:
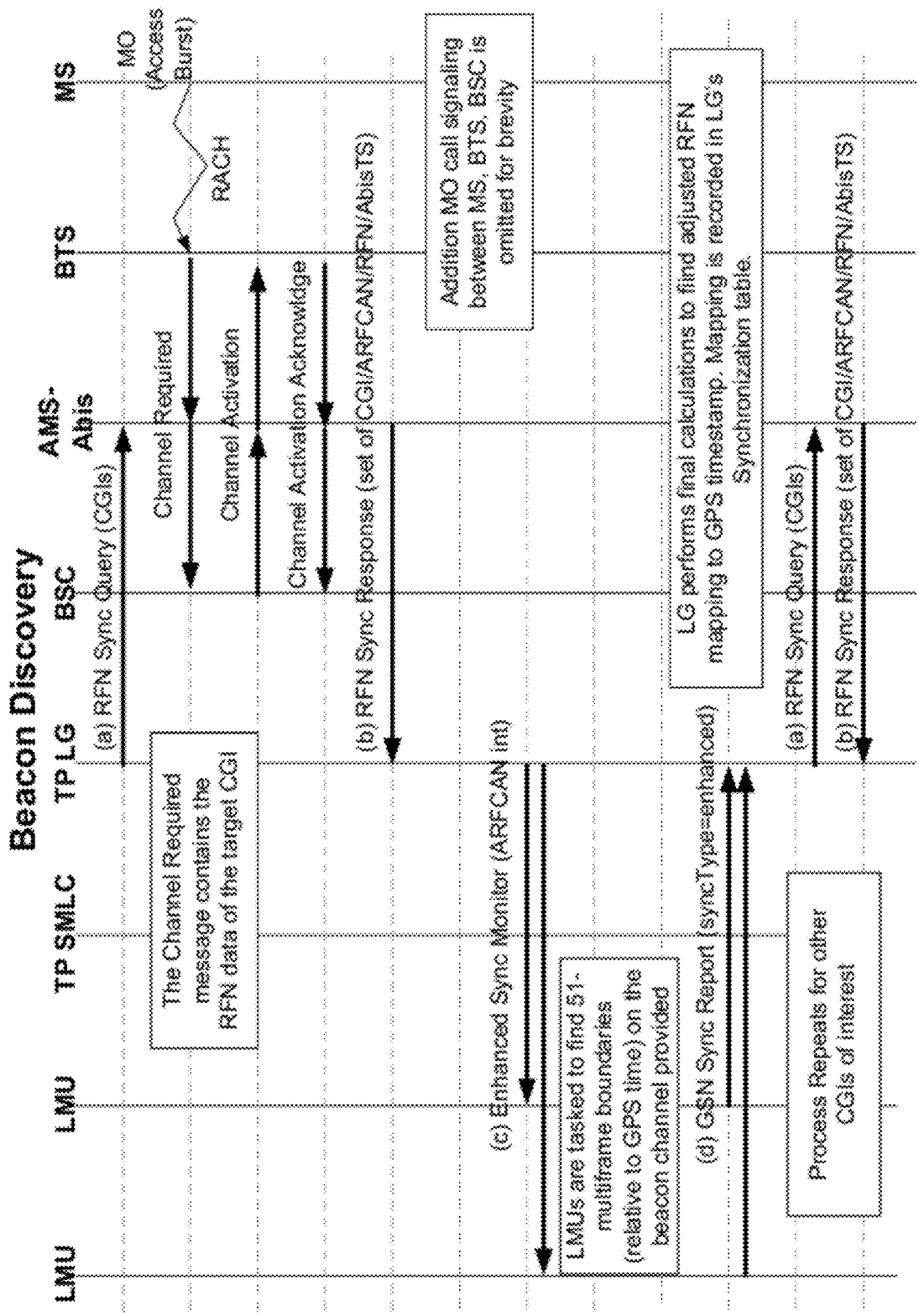
FIG. 4 illustrates a process and messaging for Beacon Discovery, which may be used for a beacon-only LMU.

The first performance limiting factor is Downlink Beacon Discovery. Locating mobile stations on a GSM network using U-TDOA techniques requires knowledge of the GSM frame timing used by the mobile station. The frame timing of the mobile is defined by the frame timing broadcast by each sector in its Downlink BCCH channel. In general, each cell sector within the GSM network has independent frame timing. When LMUs are deployed at every cell site, each LMU acquires the frame timing of the cells at that site by decoding the BCCH transmitted by those cells. This process (as shown in FIG. 4) is called Beacon Discovery. When sparse deployment is used, the frame timing of the cell where LMUs are not deployed should be discovered by LMUs at neighboring sites. If the ratio of LMUs deployed gets too low, then there will be cells for which no LMU is capable of discovering the beacons for these cells. In that case, the MSs placing calls served by those cells with undiscovered beacons may not be located. This deployment is said to be Downlink Beacon Discovery Limited.

For the sake of completeness, the Beacon Discovery process illustrated by FIG. 4 will now be summarized. As shown, the process includes the following steps:

1. The MS transmits an Access Burst on the RACH. This mobile originated call is initiated in the CGI of interest and any of the reference CGIs. Any MS requesting a dedicated channel will trigger this process.
2. The RACH signal is received by a BTS and the BTS sends a Channel Required message to the BSC and AMS (Abis monitoring system). The Channel Required message contains the RFN data of the target CGI.
3. The Location Gateway (LG) sends an RFN Sync Query message to the AMS, and the AMS responds with an RFN Sync Response, which contains a set of CGI, ARFCN, RFN, and Abis TS data.
4. The LG then sends an Enhanced Sync Monitor (AFRCN int) message to the LMUs, which are tasked to find 51 multiframe boundaries, relative to GPS time, on the beacon channel provided.
5. The LMUs respond to the LG with a GSM Sync Report (syncType=enhanced) message. The LG performs a final calculation to find an adjusted RFN mapping to GPS timestamp. This mapping is recorded in a synchronization table of the LG.
6. The process is repeated for other CGIs of interest.

Uplink Demodulation Limited

The second performance limiting factor is the ability to demodulate the uplink transmission from the mobile station. This is needed to derive a reference signal that is then used to make the TDOA measurements at the cooperating LMUs.

When LMUs are deployed at every cell site, the LMU at the site on which the call or non-call related messaging is transmitted can easily demodulate the uplink signal. When sparse deployment is used, then the uplink signal for calls placed on cells where LMUs are not deployed should be demodulated by LMUs at neighboring sites. If the ratio of LMUs deployed gets too low, then there will be cells for which no LMU is capable of demodulating uplink signals related to calls placed on that cell. In that case, calls placed on those cells may not be located. This deployment is said to be Uplink Demodulation Limited.

Accuracy Limited

Figure 5:
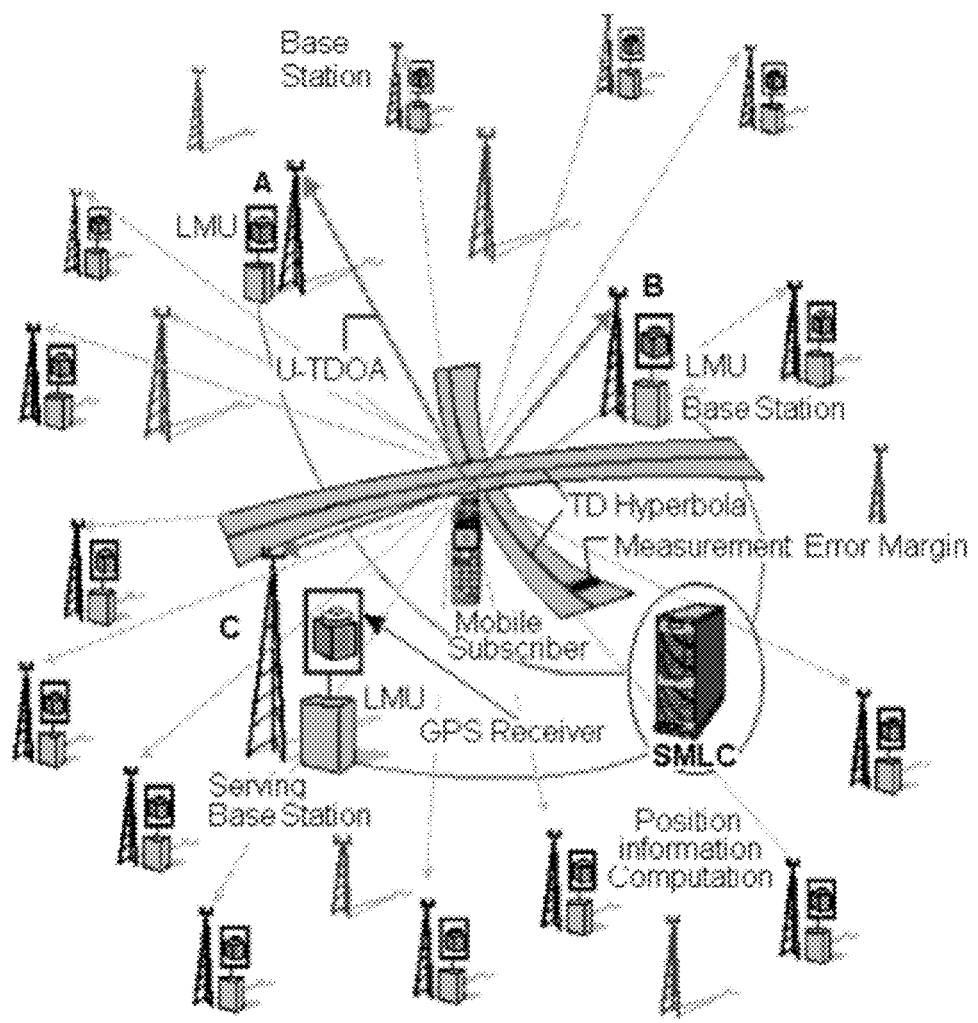
FIG. 5 illustrates a sparsed TDOA network and is referenced below in explaining that the TDOA hyperbola's width is due to timing errors between LMU clocks and unresolvable signal timing caused by multipath radio propagation. These errors may be multiplied by the GDOP.

In some cases, the U-TDOA deployment can be Accuracy Limited even though not Uplink Demodulation Limited or Downlink Beacon Discovery Limited. The cause of accuracy limited U-TDOA deployments is primarily the Geometric Dilution of Precision (GDOP). Common to all multi-lateration systems, the GDOP arises in the wireless TDOA LMU deployment from the shallowness of the angles at which the TDOA-generated hyperbola intercept. If the effect of the GDOP multiplier renders the location error in an area beyond design specifications, then the area is Accuracy Limited. FIG. 5 shows an illustrative example of a sparsed U-TDOA network with the TDOA hyperbolas widened by the timing and measurement errors induced by the radio multipath environment and the various timing and measurement errors in a real U-TDOA system.

Additional LMU deployments beyond the service area may be used to lower the GDOP within the service area, thus removing the Accuracy Limited areas. Other techniques for dealing with Accuracy Limited areas in a U-TDOA system include the addition of hybrid location technologies.

FIG. 3D, Step 314, shows the addition of Enhanced Cell-ID (ECID) to the U-TDOA system to compensate for the predicted Accuracy Limited areas. In a U-TDOA system, fallback to in situ wireless network-based location techniques is possible. These network-based location techniques include using the Cell-ID or Cell-ID with sector to generate a location based on the SMLC's knowledge of the underlying geography of the service area and the topology of the wireless network.

The use of radio propagation delay information ("timing advance" or "round-trip-time") and mobile-generated beacon power measurements can be effective (if available), with the SMLC's knowledge of the BTS beacon power levels, to refine a basic Cell-ID/sector location. This technique, Enhanced Cell ID (ECID), is a potential accuracy improvement over the basic Cell-ID techniques. ECID location is achieved by using additional Timing Advance (TA) and Power Measurement (PM) information derived from the wireless network to create a location. Use of cell-id (CGI) and timing advance (TA) as a fall-back is inherent in ECID calculations since both the CGI and TA are available to the SMLC regardless of the number or usefulness of beacon power measurements available in the Network Measurement Report (NMR). These network-based approaches to location are known to those skilled in the art as are the statistical methods used in the attempt to improve accuracy using historical usage data and radio propagation models.

In a sparse U-TDOA deployment, U-TDOA coverage is expected to provide sufficient performance over the majority of the service area. However, location coverage holes (areas of insufficient or non-existent accuracy) may exist due to the limitations of downlink beacon discovery, uplink demodulation issues inherent in a sparse U-TDOA network, and the fickle, if not capricious, nature of the radio environment.

One remedy to a coverage hole (a geographic area where the TDOA system is accuracy limited) is the installation of an additional LMU. This approach, which is shown at Step 308 of FIG. 3G as well as Step 308 of FIG. 3D (Accuracy Limited), will raise the deployment (LMU:BTS) ratio. If this approach is not satisfactory to the wireless operator, a hybrid U-TDOA/ECID system may be deployed. In addition to potentially curing the lack-of-location-coverage issue, deployment of the hybrid U-TDOA/ECID system allows for location quality-of-service differentiation for offered location-based services (LBS) applications. ECID is especially useful for LBS applications requiring low to medium accuracy with periodic updates, such as tracking while the mobile device is on conversation state.

Since the signal collection for an ECID location is performed at the mobile device using the higher-powered forward (BTS-to-mobile device) channel, ECID performance is independent of the performance limiting factors resulting from the sparsely deployed reverse-channel collecting U-TDOA deployment.

GSM ECID is a cell and sector (CGI) based approach coupled with a range (Timing Advance (TA) or Round-Trip-Time (RTT)) from the serving cell site and a power-difference-of-arrival measurement (PDOA)). In addition to the serving cell, the sector (if any) and the timing advance, the transmit power of each beacon in the network should be known and the location of each serving sector (transmit antenna) should be known by the SMLC to correctly calculate the PDOA. As an alternative to the PDOA calculation, a database of beacon strengths for a calibrated grid can be used with pattern matching. The grid within a serving cell or sector may be calibrated by recording mobile beacon reception patterns or by sophisticated radio propagation models.

ECID is also a method uniquely suited for medium accuracy location on the border area between differing U-TDOA service areas or networks. Border areas are where U-TDOA accuracy is likely to be poor due to wide cell spacing and poor network topology, which resulting in high GDOP. The wide cell spacing results from operator inclinations to put border areas in sparsely served areas. The poor network topology is the result of the differing U-TDOA networks being deployed on a sharp linear boundary. Borders in U-TDOA service areas can result from operator communications network deployment boundaries, inability of U-TDOA networks to share LMU-developed TDOA information, or the operator's election to use two or more vendors to provide U-TDOA-based wireless location systems.

Since, with ECID, the mobile receiver acts as the point of signal collection, beacon radio power can be collected by the mobile from both the serving network and the adjacent network. The SMLC awareness of the adjacent network transmitter locations and frequencies, as collected by the serving network LMU-based downlink beacon receivers, allows for the adjacent network received beacons to be used for the ECID location calculation without reliance on interoperating LMUs based on the adjacent area or network.

FIG. 3D, Step 315, shows the addition of AoA to the U-TDOA system to combat the accuracy limited performance. See U.S. Pat. Nos. 6,108,555 (Aug. 22, 2000) and 6,119,013 (Sep. 12, 2000), both or which are entitled "Enhanced Time Difference Localization System".

Improving Downlink Beacon Discovery Limited Performance

In un-synchronized networks, such as GSM or UMTS, in which the transmission time offsets of the signals radiated by one base station relative to another are unknown, LMUs should monitor beacon timing to determine the frame timing. When LMU deployments are less than 1:1 (BTS:LMU), the timing of a cell's radio transmissions should be determined not by a resident LMU but rather should be determined from an LMU in an adjacent or further cell.

The following are techniques to facilitate downlink beacon discovery in sparsed deployments.

Enhanced Downlink Antenna (Step 305 in FIG. 3B)

When the performance limiting factor is Downlink Beacon Discovery, then the first and least expensive option is the addition of enhanced downlink antennae to the LMU sites identified in proximity of the performance limited areas. Use of an enhanced downlink receive antenna allows the LMU to better detect and demodulate the beacon (the BCCH in GSM) broadcasts from surrounding cells and sectors in a sparsed deployment. Deployment of the downlink antenna can be accomplished via direct mounting to the LMU, but antennas mounted on base station exteriors or on the cell tower provide less attenuated environments and therefore better reception.

However, downlink antennas can suffer from too little attenuation as well as too much. Downlink receivers can suffer from the fact that the beacons are transmitted at such high power. For example, if an LMU (along with it's receive antenna) is located at or near one BTS, the beacons from that BTS will be received at very high power. Because of the nature of the GSM waveform, a significant portion of the energy from those beacons spillover into the adjacent frequency channels. If nearby sites that do not have LMUs located at them (sparsed sites) have their beacons transmitting on one of these adjacent channels, then the spillover from the strong local beacon can make it very difficult to detect and demodulate the weaker beacon from the remote site.

In addition to the adjacent channel problem, in some instances (like roof top deployments where the LMU downlink receive antenna is placed in close proximity to the carrier's transmit antenna) the local beacons are so strong that they saturate the front end of the LMU, thus making it impossible to detect any remote beacons even if they are not on adjacent channels. In this scenario, success may be had by introducing an inexpensive line attenuator to reduce the received signal level at the LMU's downlink receiver so that it is no longer driven into saturation. Line attenuation can result in many remote Beacons being discovered that were previously undiscovered.

Besides optimizing physical antenna placement and the application of line attenuators, a third technique, that of the application of programmable notch filters to the antenna feed, can be used. By filtering out the frequency(s) from the co-located, host BTS, the saturation issue is mitigated without degradation of remote beacon reception. In this approach, programmable filters are necessary due to the mercurial nature of the operator's frequency planning and the need to adjust to new frequency allocations that include the host BTS.

Link Monitoring for Enhanced Beacon Synchronization (Step 312 of FIG. 3C)

As disclosed in U.S. Pat. No. 6,782,264, Aug. 24, 2004, "Monitoring of Call Information in a Wireless Location System," and further expanded in U.S. Published Patent Application 20060003775, filed Jun. 10, 2005, "Advanced Triggers for Location-based Service Applications in a Wireless Location System," an Abis Monitoring System (AMS) or Link Monitoring System (LMS) can be deployed in conjunction with the wireless location system to supply a passive means of triggering the location system. As cost savings measures, an overlay LMS may be deployed to monitor the Abis (BTS-to-BSC) link only or the required LMS functionality may be incorporated directly into the BSC. The deployment of the AMS or LMS functionality allows for certain techniques allowing for lower LMU deployment densities.

The Enhanced Beacon Synchronization feature employs an LMS or AMS to monitor the Abis links of the BTS units involved, and to access the GSM Frame Number information quickly and reliably, reducing latency and improving system throughput. This enhanced synchronization technique increases the system sensitivity to discovering GSM beacons and their respective mapping to GPS time. Using this technique, the Abis monitor will provide synchronization information that will partially describe the mapping of the absolute frame number (FN) to GPS time. The parameters provided by the LMS contain the RFN (reduced frame number, T1', T2, T3), the partial description of GSM frame number. This information will be combined with observations and calculations made directly by LMUs monitoring the downlink path to further converge on the timing solution.

Specifically, "beacon synchronization" is the method by which the system determines the absolute frame time reference used by a particular CGI—the absolute time reference is used to determine the super-frame sequence as a function of time. A U-TDOA system relies upon precise knowledge of the timing of the Frame Number (FN) to properly collect the frequency-hopped signals on the correct channel at the correct time. Enhanced beacon synchronization uses coarse Frame Number (FN) measurements from the LMS, combined with a detection process on the downlink, which allows beacon timing to be measured at signal-to-noise ratios (SNRs) that are 11 dB lower than with normal downlink beacon monitoring. This improved sensitivity allows beacons to be detected by more distant LMUs, facilitating more sparse LMU deployment.

The general function of determining absolute frame timing reference begins during the basic Beacon Synchronization process. The LMU performs a four-step process to derive the timing synchronization between GSM frames and GPS time:
1. LMU detects the frequency control channel (FCCH), which is used to correct for frequency offset in the BTS.
2. LMU detects the synchronization channel (SCH) to derive accurate timing. While the LMU knows the frame timing, it does not know the absolute frame number or which cell is transmitting (CGI).
3. LMU demodulates the broadcast control channel (BCCH) and decodes the frame number and the CGI. Note that demodulation of the signal relies upon a significantly higher SNR than Steps 1 and 2 above, since detection is easier than demodulation.
4. This absolute frame timing reference is available for LMUs to aid in the collection of signals in the U-TDOA location process.

The Enhanced Beacon Synchronization builds on the basic Beacon Synchronization process as follows:
1. The AMS provides multiple measurements for each BTS on which the enhanced process is needed. These measurements include the CGI.
2. Correlation of these messages is performed to derive a reduced frame number (16 out of the 22 bits needed to represent the full frame number) and a rough estimate of the timing synchronization between GSM frames and GPS time.
3. The reduced frame number (16 out of 22 bits) information is sent to the LMU, which then performs the FCCH and SCH detections (steps 1 and 2 above) and returns the accurate time alignment. Since the LMU no longer has to demodulate the BCCH channel, detection can be performed at lower SNRs.
4. The accurate timing provided by the LMU is combined with the reduced frame number previously computed. This Frame Number is then available to aid in the signal collection by the LMUs for location.

Downlink only LMU Deployments (Step 311 of FIG. 3C)

One technique for increasing the location system performance in Downlink Beacon Discovery limited areas is the targeted installation of downlink-only LMU units. A low-cost, easily-installed receiver unit is deployed to measure downlink beacon timing in cell sites without an LMU deployed using the process shown in FIG. 4. By decreasing the number of LMUs deployed and installing units that provide beacon discovery (but are not capable of cooperating in location processing) to fill in beacon coverage "holes", a lower overall system cost is attained. This unit may use a wired or wireless backhaul to the SMLC or to another LMU for forwarding to the SMLC. The backhaul is irrelevant to the timing collection, so variable link latencies will not affect operation.

The downlink LMU can be used to collect raw timing data or be deployed with a GPS module allowing for an offset from GPS system to be locally calculated. Deployment with a GPS module simplifies the process of providing beacon timing offsets, but the GPS module increases cost and size of the unit and restricts mounting to areas with GPS coverage. Use of a local clock source or offsets from other beacons allows elimination of the GPS module and saving the cost of the GPS receiver and GPS antenna; allows more flexible mounting options (should be able to detect common beacon to deployed LMU) but relies upon the SMLC to calculate the beacon timing offset from a common observed beacon.

All the beacons could be timed relative to each other, or to some other arbitrary time. This timing approach would be fine for the purposes of beacon discovery, but does not generate enough timing accuracy for U-TDOA measurements, so accurate GPS-based timing is still required at LMU sites. Beacon discovery can be off by many micro-seconds and still be functional, but accurate U-TDOA requires ~25-50 nano-seconds clock accuracy for U-TDOA calculations.

The downlink LMU unit may use an internal antenna, but can support an external antenna for added gain in situations where an insufficient number of beacons are received.

The typical unit's receiver system is single-channel with support for multiple antennas to allow diversity reception. In keeping with the multi-band deployments, the units are capable of tuning across multiple frequency bands. The receiver unit is designed to support downlink reception only but can be coupled with a wireless transceiver to allow wireless backhaul. The unit is dedicated to beacon search and reporting of beacon timing or beacon offset timing from a local clock or in relation to another beacon.

In very limited cases, using knowledge of the wireless communications network gained in the initial analysis, it is possible to use the co-synchronous clusters to map beacon timing from a beacon that an LMU can detect to a beacon an LMU cannot detect but is known to be co-synchronous to a detected beacon. This often applies to sectors within a cell site but could also apply to other groups as well if BTS synchronization via a common clock is used.

Improving Uplink Demodulation Limited Performance (See FIGS. 3F and 3G)

If the preliminary network design analysis (Step 303, FIG. 3A) shows that the sparsed U-TDOA deployment is Uplink Demodulation Limited, five techniques can be used to mitigate or correct Uplink Demodulation Limited Performance. The first of these techniques (Step 319, FIG. 3F) requires that the wireless network be configured to forward radio messages or bit sequence(s) from the reverse channel (mobile device-to-Base Station) radio messaging for re-modulation to the wireless location system into a representative signal for signal correlation processing.

The second technique (Step 318, FIG. 3F) requires an AMS or LMS and extract bit-sequence(s) from the reverse channel radio messaging for re-modulation into a representative signal for signal correlation processing.

The third technique (Step 317, FIG. 3F) avoids the need for signal demodulation and passive monitoring by using only a known bit-sequence in the radio messaging for signal correlation processing.

The fourth technique (Step 320, FIG. 3G) for combating Uplink Demodulation Limited areas is the addition of dedicated antenna, or addition of signal processing that combine inputs from all available antenna, to LMUs within or in proximity to the affected geographic area. LMUs are selected based on the predicted improvement in SNR for points within the affected area and the orthogonality of the resultant TDOA hyperbola(s).

The fifth technique (Step 308, FIG. 3G) is to add LMU(s) within or in proximity to the area where the current TDOA design is Uplink Demodulation Limited. The LMU location is selected based on the data developed from the system design, planning and evaluation tools and models previously described.

Forwarded Demodulated Data_(FIG. 3F, Steps 316 and 319)

As introduced above, the wireless communications network can sample and forward bit sequences that occur on the reverse control and/or traffic radio channel.

This bit sequence or sample is then modulated to produce a baseband signal. This re-modulated baseband signal is then used as the reference signal. The reference signal can then be correlated against the recorded received signal at receiving sites where LMUs are deployed to provide TDOA estimates between the ideal reference and received signal at those sites. (See U.S. Pat. No. 5,327,144, Jul. 5, 1994, "Cellular Telephone Location System." and U.S. Pat. No. 6,047,192, Apr. 4, 2000, "Robust Efficient Localization System".)

This technique is especially suited to instances where the LMU functionality has been incorporated into a base station transceiver the bit sequence is quickly delivered using the internal BTS communications paths. The integration of the LMU with the wireless communications system eliminates the need and cost of the standalone passive monitoring device from the wireless location system deployment.

Link Monitoring for Improving Uplink Performance (FIG. 3F, Steps 310 and 318)

As discussed above, a Link Monitoring Subsystem (LMS) can be used to supply a passive means of triggering the location system. The LMS system also allows for certain techniques allowing for lower LMU deployment densities by improving the uplink demodulation performance. In a non-sparse U-TDOA deployment, the reference signal is normally produced by the LMU resident in the serving cell or an LMU resident in an adjacent cell. In sparsed deployments, no LMU may be able to successfully receive a signal with sufficient quality to be demodulated with minimal errors. In this case, the LMS (or AMS) may be used to capture a bit sequence sample that was included in the signal. This sample is then re-modulated to produce a baseband signal. This re-modulated baseband signal is then used as the reference signal. The reference signal can then be correlated against the recorded received signal at receiving sites where LMUs are deployed to provide TDOA estimates between the ideal reference and received signal at those sites. (See U.S. Pat. No. 5,327,144, Jul. 5, 1994, "Cellular Telephone Location System.") Again, as noted above, obtaining the demodulation data from an AMS or other link monitoring system can reduce the cost/complexity of the LMU, which is advantageous even when sparsing is not an issue.

Known Sequence Correlation for Improving Uplink Performance (Step 317, FIG. 3F)

The successful measurement of TDOA values requires a "clean" (high SNR, low phase noise, low interference, etc.) reference signal with which measured signals from multiple sites are correlated to provide an estimate of the TDOA between the reference signal and the signal received at each site. This reference signal is typically acquired in one of two ways in a non-sparsed U-TDOA network. The first approach is to use the received signal at a site that is close to the mobile (e.g., the serving cell site) as the reference signal. This approach assumes that the link budgets are such that the received signal at close-by sites is also fairly clean (uncorrupted by radio interference or noise). The second approach is to reconstruct an ideal reference signal by demodulating (and if necessary, decoding) the received signal at one site, then using this data to generate the expected waveform at the received site. This approach assumes the signal is received at one or more sites with sufficient quality to be demodulated with minimal errors.

In the case of a sparsed LMU deployment, it is possible that neither of these approaches will provide an adequate reference signal. This scenario can be caused by the mobile being at a location such that no LMUs receive a high quality signal from the mobile station. In this case, the first approach results in a low SNR signal that does not serve as a good reference signal. Since the quality of the signal is poor at all sites where LMUs are deployed, the second approach of reconstructing a reference will also fail because the poor quality signal cannot be reliably demodulated (likely to have many bit errors).

Many waveforms, however, have known patterns (e.g., Training Sequence Code in Mid-amble of GSM, Synch and DVCC in IS-136, etc.) that are transmitted along with the unknown user data to aid in acquisition, synchronization, and/or equalization. With prior knowledge of these patterns, an ideal reference can be generated that represents the expected received waveform associated with these known fields. This reference can then be correlated against the received signal at receiving sites where LMUs are deployed to provide TDOA estimates between the ideal reference and received signal at those sites. (See U.S. Pat. No. 6,047,192, Apr. 4, 2000, "Robust, Efficient, Localization System.")

D. Conclusion

The true scope the present invention is not limited to the presently preferred embodiments disclosed herein. For example, the foregoing disclosure of a presently preferred embodiment of a Wireless Location System uses explanatory terms, such as Signal Collection System (SCS), TDOA Location Processor (TLP), Applications Processor (AP), Location Measuring Unit (LMU), and the like, which should not be construed so as to limit the scope of protection of the following claims, or to otherwise imply that the inventive aspects of the Wireless Location System are limited to the particular methods and apparatus disclosed. Moreover, as will be understood by those skilled in the art, many of the inventive aspects disclosed herein may be applied in location systems that are not based on TDOA techniques. For example, the invention is not limited to systems employing SCS's constructed as described above. The SCS's, TLP's, etc. are, in essence, programmable data collection and processing devices that could take a variety of forms without departing from the inventive concepts disclosed herein. Given the rapidly declining cost of digital signal processing and other processing functions, it is easily possible, for example, to transfer the processing for a particular function from one of the functional elements (such as the TLP) described herein to another functional element (such as the SCS) without changing the inventive operation of the system. In many cases, the place of implementation (i.e., the functional element) described herein is merely a designer's preference and not a hard requirement. Accordingly, except as they may be expressly so limited, the scope of protection of the following claims is not intended to be limited to the specific embodiments described above.

What is claimed:

1. A method for designing a sparse wireless location system (WLS) associated with a wireless communications system comprising a plurality of geographically dispersed base transceiver stations (BTSs) configured to broadcast downlink beacons to be received by mobile wireless devices, comprising:

performing an intelligent network design process to produce the initial network design;

determining that the initial network design is affected by a downlink beacon discovery performance limiting factor;

modifying the initial network design by performing at least one of the following actions to produce an updated sparse WLS design:

deploying at least one enhanced downlink antenna;

deploying downlink interference cancellation;

determining that an Abis monitoring system (AMS) is not deployed, and then deploying at least one downlink-only location measuring unit (LMU) at an identified site; and determining that an Abis monitoring system (AMS) is deployed, and then enabling the use of Enhanced Beacon Synchronization (EBS) and AMS-derived beacon timing functions; and performing another iteration of the intelligent network design process with updated design specifications and determining whether another performance limiting factor affects the updated sparse WLS design.

2. A method for designing a sparse wireless location system (WLS) to be associated with a wireless communications system comprising a plurality of geographically dispersed base transceiver stations (BTSs), comprising:

performing an intelligent network design process to produce the initial network design;

determining that the initial network design is affected by a downlink beacon discovery performance limiting factor;

modifying the initial network design by performing at least one of the following actions to produce an updated sparse WLS design:

deploying at least one enhanced downlink antenna;

deploying downlink interference cancellation;

determining that an Abis monitoring system (AMS) is not deployed, and then deploying at least one downlink-only location measuring unit (LMU) at an identified site; and determining that an Abis monitoring system (AMS) is deployed, and then enabling the use of Enhanced Beacon Synchronization (EBS) and AMS-derived beacon timing functions;

performing another iteration of the intelligent network design process with updated design specifications and determining that the updated sparse WLS design is affected by an accuracy performance limiting factor, and modifying the updated sparse WLS design by performing at least one of the following actions:

increasing an integration time at one or more LMUs;

deploying a hybrid time difference of arrival (TDOA)/ enhanced cell identification (ECID) location process in the WLS; and deploying a hybrid TDOA/ angle of arrival (AoA) location process in the WLS.

3. A method as recited in claim 1 or claim 2, wherein said WLS comprises an uplink time difference of arrival (U-TDOA) system including a plurality of geographically dispersed LMUs.

4. A method as recited in claim 1 or claim 2, wherein said WLS is overlaid on a GSM wireless communications system comprising said plurality of geographically dispersed BTSs.

5. A method as recited in claim 1 or claim 2, further comprising identifying at least one cluster of co-synchronized cell sectors.

6. A method as recited in claim 1 or claim 2, further comprising determining that the initial network design or a modified version thereof is affected by an uplink demodulation performance limiting factor, determining that communications system demodulation data is enabled, and enabling a demodulated data feature.

7. A method as recited in claim 1 or claim 2, further comprising determining that the initial network design or a modified version thereof is affected by an uplink demodulation performance limiting factor, determining that communications system demodulation data is not enabled, determining that an AMS is not deployed and enabling a mid-amble only correction feature.

8. A method as recited in claim 1 or claim 2, further comprising determining that the initial network design or a modified version thereof is affected by an uplink demodulation performance limiting factor, determining that communications system demodulation data is not enabled, and determining that an AMS is deployed and enabling an AMS-derived demodulated data feature.

9. A method as recited in claim 1 or claim 2, further comprising determining that the initial network design or a modified version thereof is affected by an uplink demodulation performance limiting factor, and adding at least one LMU to the network design.

10. A method as recited in claim 1 or claim 2, further comprising determining that the initial network design or a modified version thereof is affected by an uplink demodulation performance limiting factor, and adding at least one dedicated antenna facility to the network design.

11. A non-transitory computer readable medium comprising computer readable instructions for carrying out a prescribed method for designing a sparse wireless location system (WLS) associated with a wireless communications system comprising a plurality of geographically dispersed base transceiver stations (BTSs) configured to broadcast downlink beacons to be received by mobile wireless devices, said prescribed method comprising:

performing an intelligent network design process to produce the initial network design;

determining that the initial network design is affected by a downlink beacon discovery performance limiting factor;

modifying the initial network design by performing at least one of the following actions to produce an updated sparse WLS design:

deploying at least one enhanced downlink antenna;

deploying downlink interference cancellation;

determining that an Abis monitoring system (AMS) is not deployed, and then deploying at least one downlink-only location measuring unit (LMU) at an identified site;

determining that an Abis monitoring system (AMS) is deployed, and then enabling the use of Enhanced Beacon Synchronization (EBS) and AMS-derived beacon timing functions; and performing another iteration of the intelligent network design process with updated design specifications and determining whether another performance limiting factor affects the updated sparse WLS design.

12. A non-transitory computer readable medium comprising computer readable instructions for carrying out a prescribed method for designing a sparse wireless location system (WLS) from an initial network design, wherein the sparse WLS is to be associated with a wireless communications system comprising a plurality of geographically dispersed base transceiver stations (BTSs), said prescribed method comprising:

performing an intelligent network design process to produce the initial network design;

determining that the initial network design is affected by a downlink beacon discovery performance limiting factor;

modifying the initial network design by performing at least one of the following actions to produce an updated sparse WLS design:

deploying at least one enhanced downlink antenna;

deploying downlink interference cancellation;

determining that an Abis monitoring system (AMS) is not deployed, and then deploying at least one downlink-only location measuring unit (LMU) at an identified site;

determining that an Abis monitoring system (AMS) is deployed, and then enabling the use of Enhanced Beacon Synchronization (EBS) and AMS-derived beacon timing functions;

performing another iteration of the intelligent network design process with updated design specifications and determining that the updated sparse WLS design is affected by an accuracy performance limiting factor, and modifying the updated sparse WLS design by performing at least one of the following actions:

increasing an integration time at one or more LMUs;

deploying a hybrid time difference of arrival (TDOA)/ enhanced cell identification (ECID) location process in the WLS;

deploying a hybrid TDOA/ angle of arrival (AoA) location process in the WLS; and adding at least one LMU to the network design.

13. A computer readable medium as recited in claim 11 or 12, wherein said WLS comprises an uplink time difference of arrival (U-TDOA) system including a plurality of geographically dispersed LMUs.

14. A computer readable medium as recited in claim 11 or 12, wherein said WLS is overlaid on a GSM wireless communications system comprising the plurality of geographically dispersed BTSs.

15. A computer readable medium as recited in claim 11 or 12, wherein said prescribed method further comprises identifying at least one cluster of co-synchronized cell sectors and performing an intelligent network design process to produce said initial network design.

16. A computer readable medium as recited in claim 11 or 12, wherein said prescribed method further comprises determining that the initial network design or a modified version thereof is affected by an uplink demodulation performance limiting factor, determining that communications system demodulation data is enabled, and enabling a demodulated data feature.

17. A computer readable medium as recited in claim 11 or 12, wherein said prescribed method further comprises determining that the initial network design or a modified version thereof is affected by an uplink demodulation performance limiting factor, determining that communications system demodulation data is not enabled, determining that an AMS is not deployed, and enabling a mid-amble only correction feature.

18. A computer readable medium as recited in claim 11 or 12, wherein said prescribed method further comprises determining that the initial network design or a modified version thereof is affected by an uplink demodulation performance limiting factor, determining that communications system demodulation data is not enabled, and determining that an Abis monitoring system (AMS) is deployed and enabling an AMS-derived demodulated data feature.

19. A computer readable medium as recited in claim 11 or 12, wherein said prescribed method further comprises determining that the initial network design or a modified version thereof is affected by an uplink demodulation performance limiting factor, and adding at least one LMU to the network design.

20. A computer readable medium as recited in claim 11 or 12, wherein said prescribed method further comprises determining that the initial network design or a modified version thereof is affected by an uplink demodulation performance limiting factor, and adding at least one dedicated antenna facility to the network design.

* * * * *